(12) United States Patent
Beber et al.

(10) Patent No.: US 10,390,651 B2
(45) Date of Patent: Aug. 27, 2019

(54) COFFEE PRESS WITH INTEGRATED SCALE

(71) Applicant: WHIRLPOOL CORPORATION, Benton Harbor, MI (US)

(72) Inventors: Kevin J. Beber, Granger, IN (US); Daniel Rellis, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 85 days.

(21) Appl. No.: 15/040,351

(22) Filed: Feb. 10, 2016

(65) Prior Publication Data

US 2016/0255989 A1 Sep. 8, 2016

Related U.S. Application Data

(60) Provisional application No. 62/128,575, filed on Mar. 5, 2015.

(51) Int. Cl.
| | |
|---|---|
| *A47J 31/38* | (2006.01) |
| *A47J 31/20* | (2006.01) |
| *A47J 31/44* | (2006.01) |
| *A23F 5/26* | (2006.01) |
| *A47J 31/52* | (2006.01) |

(52) U.S. Cl.
CPC .............. *A47J 31/38* (2013.01); *A23F 5/262* (2013.01); *A47J 31/20* (2013.01); *A47J 31/44* (2013.01); *A47J 31/52* (2013.01)

(58) Field of Classification Search
CPC .. A47J 31/38; A47J 31/20; A47J 31/44; A47J 31/52; A23F 5/262

USPC ......... 99/295, 297, 298, 299, 285, 286, 287, 99/288
See application file for complete search history.

(56) References Cited

U.S. PATENT DOCUMENTS

| | | | |
|---|---|---|---|
| 2,665,898 | A | 1/1954 | Campbell |
| 4,058,179 | A | 11/1977 | Price |
| 4,114,709 | A | 9/1978 | Jacobs et al. |
| 4,136,750 | A | 1/1979 | Strickler |
| 4,254,841 | A | 3/1981 | Loskill |
| 4,273,203 | A | 6/1981 | Blawert et al. |
| 4,999,109 | A | 3/1991 | Sabre |

(Continued)

FOREIGN PATENT DOCUMENTS

| | | |
|---|---|---|
| DE | 10148404 A1 | 4/2003 |
| WO | 9847596 A1 | 10/1998 |

(Continued)

*Primary Examiner* — Phuong T Nguyen
(74) *Attorney, Agent, or Firm* — Price Heneveld LLP

(57) ABSTRACT

A coffee press apparatus includes an outer container having a cavity with upper and lower portions. A handle assembly extends outwardly from on the outer container and includes a user interface. An inner vessel is disposed in the upper portion of the cavity of the outer container. A scale assembly is coupled to the inner vessel and disposed in the lower portion of the cavity of the outer container. The scale assembly is electrically coupled to the user interface in assembly and configured to weigh the contents of the inner vessel in use. A plunger assembly extends into a cavity of the inner vessel and is slideably received through a lid assembly. The plunger assembly includes a first filter assembly, and the lid assembly includes a second filter assembly.

15 Claims, 21 Drawing Sheets

(56) References Cited

U.S. PATENT DOCUMENTS

| | | | |
|---|---|---|---|
| 5,094,153 A * | 3/1992 | Helbling | A47J 31/52 99/280 |
| 5,725,898 A | 3/1998 | Murphy et al. | |
| 5,853,788 A | 12/1998 | Murphy et al. | |
| 7,032,505 B2 | 4/2006 | Brady | |
| 7,032,507 B2 | 4/2006 | Cai | |
| 7,067,168 B1 | 6/2006 | Podlucky et al. | |
| 7,992,486 B2 | 8/2011 | Constantine et al. | |
| 8,371,211 B2 | 2/2013 | Nosler et al. | |
| 8,375,846 B2 | 2/2013 | Baccetti | |
| 8,402,888 B2 | 3/2013 | Baccetti | |
| 8,515,574 B2 | 8/2013 | Studor et al. | |
| 8,770,097 B2 | 7/2014 | McLean et al. | |
| 2003/0079612 A1 | 5/2003 | Con | |
| 2009/0020018 A1 * | 1/2009 | Melzer | A47J 31/0615 99/288 |
| 2011/0048240 A1 * | 3/2011 | Siu | A47J 27/21041 99/285 |
| 2013/0160656 A1 * | 6/2013 | McCormick | A47J 31/4482 99/299 |
| 2013/0164422 A1 * | 6/2013 | McCormick | A47J 31/545 426/433 |

FOREIGN PATENT DOCUMENTS

| | | | |
|---|---|---|---|
| WO | 2007101355 | A1 | 9/2007 |
| WO | 2008081238 | A2 | 7/2008 |
| WO | 2013072798 | A1 | 5/2013 |

* cited by examiner

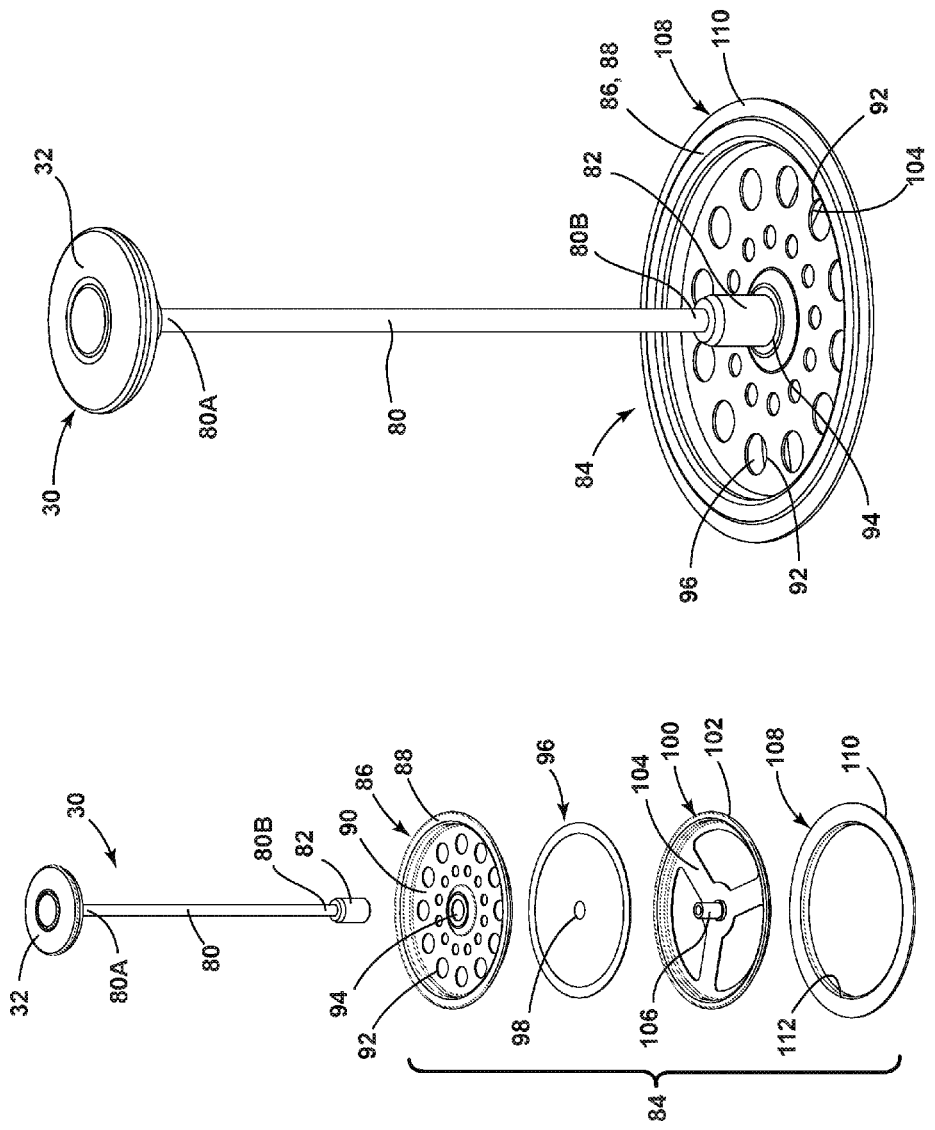

COFFEE PRESS WITH INTEGRATED SCALE

CROSS REFERENCE TO RELATED APPLICATION

This present application claims the benefit of United States Provisional Application No. 62/128,575 entitled "COFFEE PRESS WITH INTEGRATED SCALE" filed on Mar. 5, 2015, the entire contents of which are incorporated by reference.

BACKGROUND

The present concept generally relates to a coffee press apparatus and, more particularly, to a coffee press apparatus having an integrated scale.

SUMMARY

One aspect of the present concept includes a coffee press apparatus having an outer container with a cavity with upper and lower portions. A handle assembly extends outwardly from on the outer container and includes a user interface. An inner vessel is disposed in the upper portion of the cavity of the outer container. A scale assembly is coupled to the inner vessel and disposed in the lower portion of the cavity of the outer container. The scale assembly is electrically coupled to the user interface in assembly. A plunger assembly extends into a cavity of the inner vessel and is slideably received through a lid assembly. The plunger assembly includes a first filter assembly, and the lid assembly includes a second filter assembly.

Another aspect of the present concept includes a coffee press apparatus having an outer container with an upper cavity and a lower cavity. An inner vessel is disposed in the upper cavity of the outer container and a scale assembly is operably coupled to the inner vessel and disposed within the lower cavity of the outer container. The scale assembly is configured to weigh contents of the inner vessel for a brewing cycle. A user interface is electrically coupled to the scale assembly and configured to display a weight of the contents of the inner vessel. A plunger assembly is slideably received through a lid assembly and includes a primary filter assembly. The lid assembly includes a secondary filter assembly.

Yet, another aspect of the present concept includes a method of brewing a coffee beverage using a coffee press apparatus. The method includes the steps of providing access to a vessel of the coffee press apparatus; introducing an amount of ground coffee into the vessel; weighing the amount of ground coffee using a scale assembly operably coupled to the vessel; displaying a weight of ground coffee on a user interface of the coffee press apparatus; taring the scale assembly using the user interface; introducing an amount of heated water into the vessel; weighing the amount of heated water using the scale assembly; displaying a weight of heated water on the user interface of the coffee press apparatus; initiating a timing sequence through the user interface during which a coffee beverage is brewed in the vessel; securing a plunger assembly on the vessel, wherein the plunger assembly includes a filter assembly; and plunging the filter assembly of the plunger assembly to provide a filtered coffee beverage within the vessel.

These and other aspects, objects, and features of the present concept will be understood and appreciated by those skilled in the art upon studying the following specification, claims, and appended drawings.

BRIEF DESCRIPTION OF THE DRAWINGS

In the drawings:

FIG. 4A is an exploded perspective view of a plunger assembly;

FIG. 4B is a perspective view of the plunger assembly of FIG. 4A as assembled;

DETAILED DESCRIPTION OF THE PREFERRED EMBODIMENTS

Figure 1A:
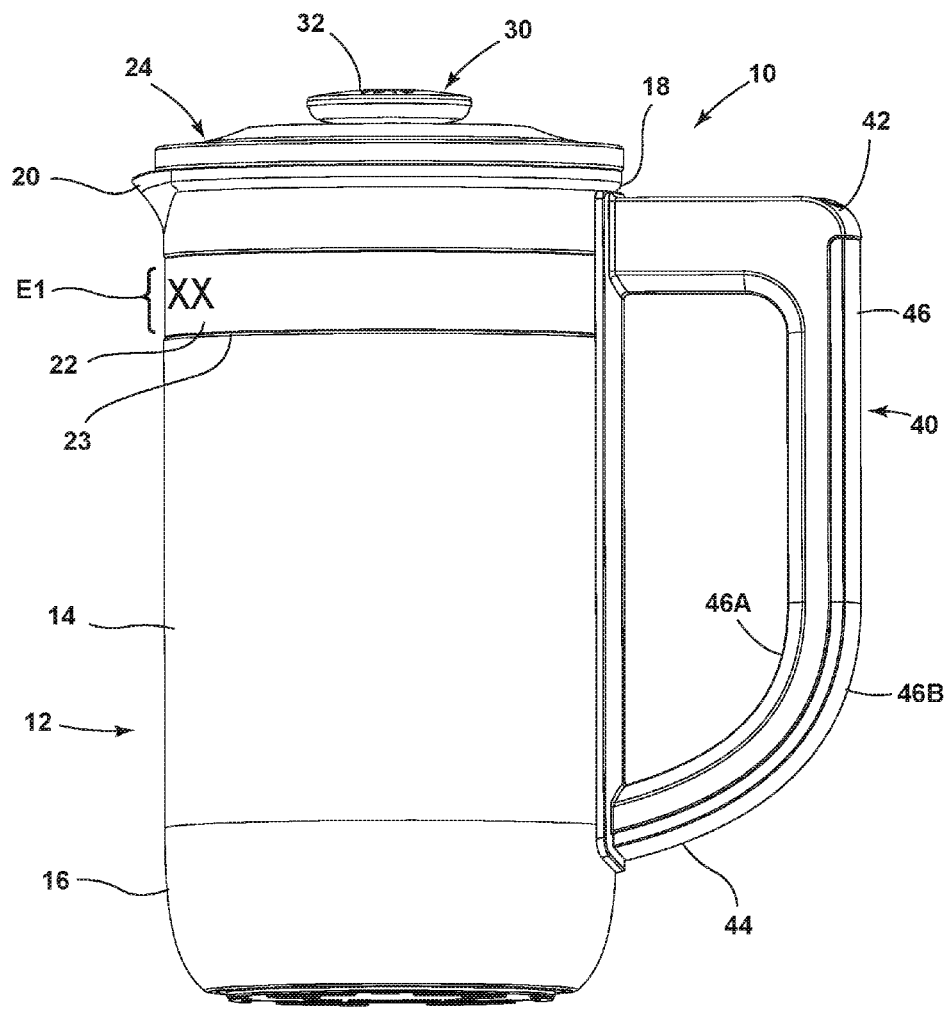
FIG. 1A is a side perspective view of a coffee press apparatus according to one embodiment of the present concept.

For purposes of description herein, the terms "upper," "lower," "right," "left," "rear," "front," "vertical," "horizontal," and derivatives thereof shall relate to the concept as oriented in FIG. 1A. However, it is to be understood that the concept may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, a coffee press apparatus 10 is shown having an outer container 12 which is generally comprised of a cylindrical sidewall 14, a bottom portion 16, and an upper rim 18 having a spout 20 formed thereon. As further shown in FIG. 1A, the outer container 12 further includes a trimband 22 disposed around sidewall 14 at a recessed portion 23 thereof, wherein the trimband 22 may be used to display an emblem E1. Abuttingly and removeably supported on the upper rim 18 of the outer container 12, a lid assembly 24 closes off an opening, as further described below, of the coffee press 10 and further serves as a guide for a plunger assembly 30 as further described below with reference to FIGS. 4A-4C. The plunger assembly 30 is removeably received in an inner vessel and includes a plunger handle 32 which is configured for engagement by a user. Both the lid assembly 24 and plunger assembly 30 are removable from the coffee press apparatus 10 to provide access to an inner vessel disposed in the outer container 12. The coffee press apparatus 10 further includes a handle assembly 40 which extends outwardly from the sidewall 14 of the outer container 12. The handle assembly 40 includes an upper portion 42 and a lower portion 44 which directly connect to the sidewall 14 of the outer container 12. A vertically extending handle member 46 is disposed between the upper and lower portions 42, 44 of the handle assembly 40.

Figure 1B:
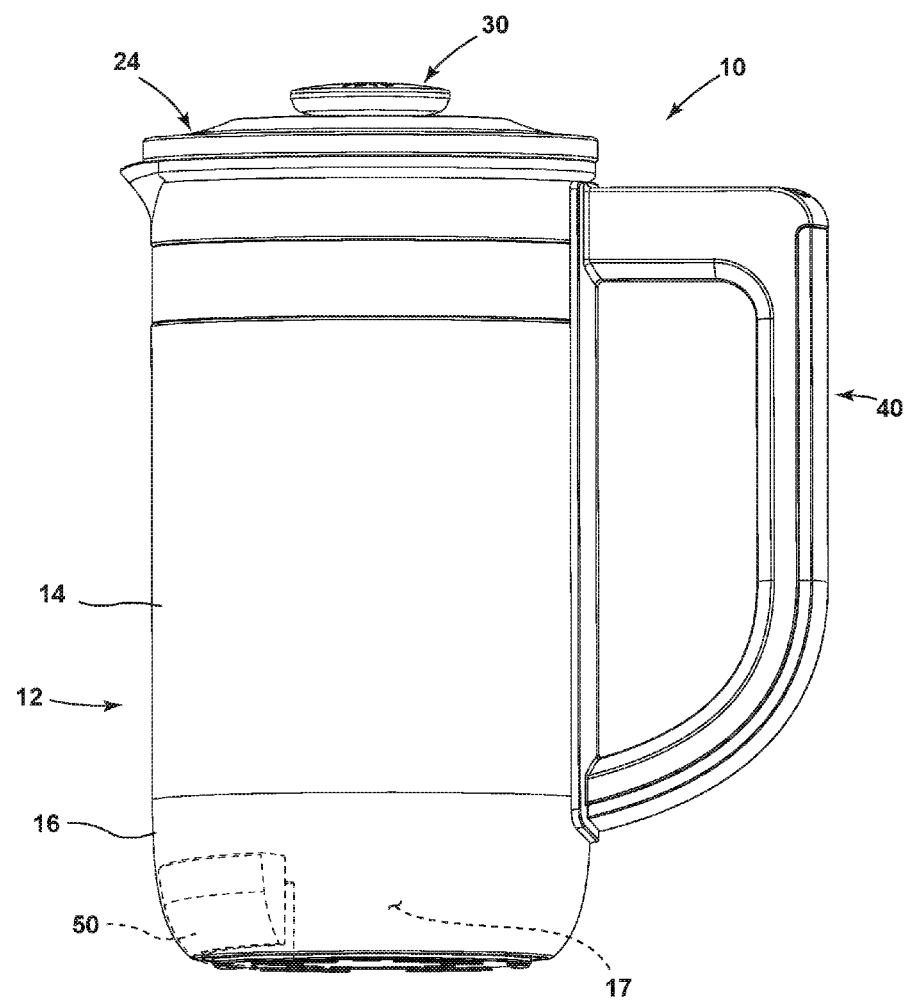
FIG. 1B is a side perspective view of the coffee press apparatus of FIG. 1 showing a weighted member disposed therein.

Referring now to FIG. 1B, an added weight member 50 is disposed in a lower cavity 17 of the outer container 12 and is used to provide balance to the coffee press apparatus 10 in use. It is contemplated that upper cavity 12A and lower cavity 17 are portions of the same cavity defined by the outer container 12, wherein lower cavity 17 defines the space below an inner vessel 140, and the upper cavity 12A defines the space occupied by the inner vessel 140, as further described below with reference to FIGS. 8B and 8C.

Figure 1C:
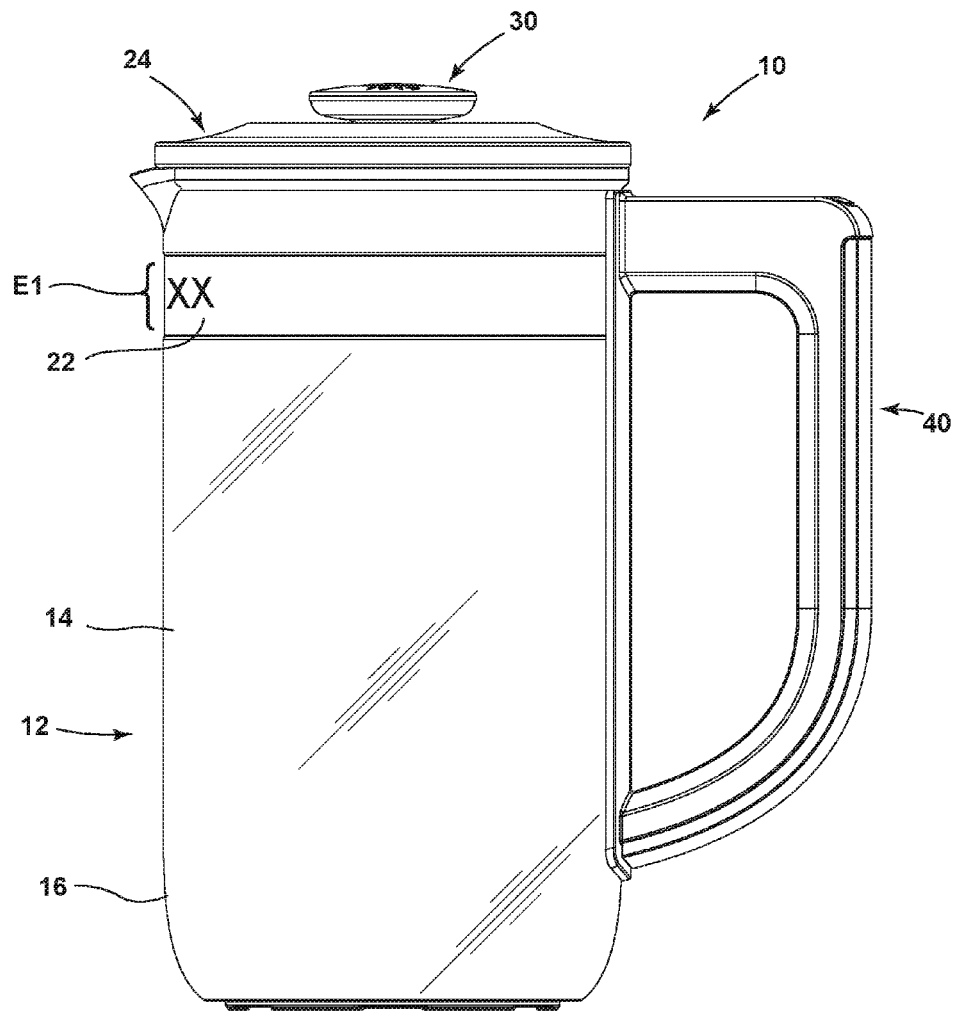
FIG. 1C is a side perspective view of a coffee press apparatus according to another embodiment of the present concept.

Referring now to FIG. 1C, another embodiment of the coffee press apparatus 10 is shown, wherein it is contemplated that the outer container 12 is comprised of a polished stainless steel or a bright annealed stainless steel to provide a pleasing aesthetic for a user. The trimband 22 is contemplated to be comprised of a metallic material, such as a horizontally brushed aluminum. The handle member 46 is shown having an inner handle portion 46A and an outer handle cover 46B. The inner handle portion 46A is contemplated to be comprised of a soft-touch plastic or rubberized material, while the outer handle cover 46B is contemplated to include a metallic chrome plate, or an electro-plated plastic trim piece. As further shown in FIG. 1C, the lid assembly 24 and plunger handle 32 can be made from a polished stainless steel as well.

Figure 2:
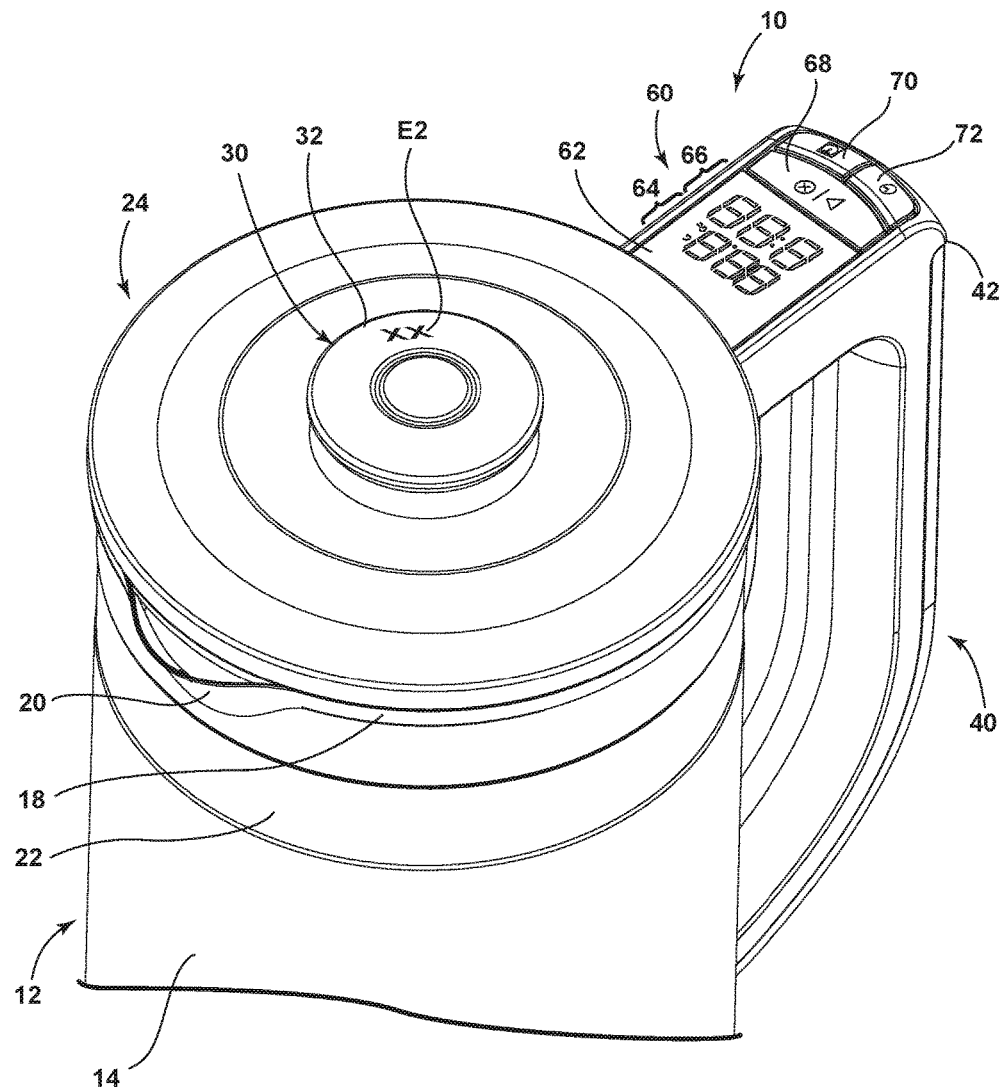
FIG. 2 is a fragmentary top perspective view of the coffee press apparatus of FIG. 1C.
Figure 3:
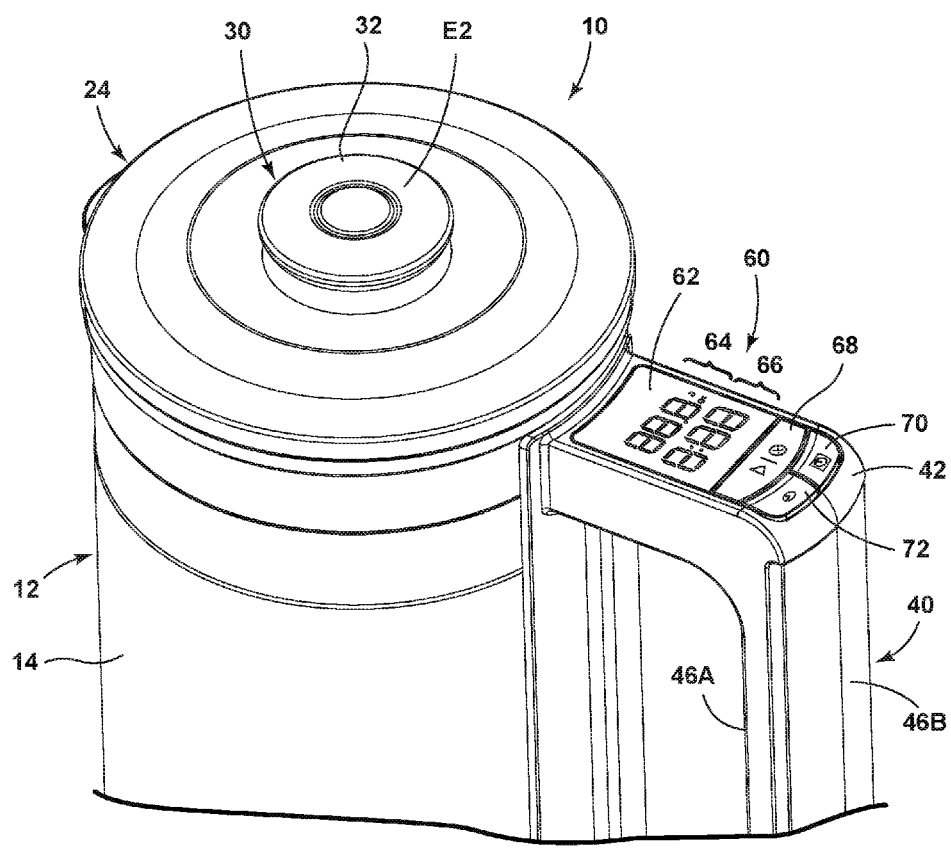
FIG. 3 is a fragmentary top perspective view of the coffee press apparatus of FIG. 1C.

Referring now to FIGS. 2 and 3, the coffee press apparatus 10 is shown from a top perspective view, wherein the spout 20 of the upper rim 18 of the outer container 12 is shown spaced away from the lid assembly 24, such that the spout 20 provides access to an inner vessel, as further described below, thereby allowing the contents of the coffee press apparatus 10 to flow from the inner vessel, through the lid assembly 24, and through the spout 20 when the coffee press apparatus 10 is tilted by a user. As further shown in FIGS. 2 and 3, the upper portion 42 of the handle assembly 40 includes a user interface 60 which generally includes a display screen 62 which is configured to display a measured weight in a first portion 64 and a timing sequence in a second portion 66. The weight and timing sequences are further described below with reference to a method of using the coffee apparatus 10 shown in FIG. 14. The user interface 60 further includes buttons 68, 70 and 72, wherein it is contemplated that button 68 is an on/off button having on/off insignia disposed thereon. Button 70 is contemplated to be a scale button having a scale insignia disposed thereon. Button 72 is contemplated to be a timer button having a clock insignia disposed thereon. While the user interface 60 is shown in FIG. 2 with a specific configuration of the buttons 68-72 relative to the display screen 62, it is contemplated that any configuration of buttons and display screens can be used with the user interface 60, as well as any associated insignias, without departing from the spirit of the present concept. As best shown in FIG. 3, the measured weight displayed in the first portion 64 of the display screen 62 can toggle between multiple units, such as grams (G) and ounces (Oz), as selected by a user within the settings of the user interface 60. As further shown in FIGS. 2 and 3, the plunger handle 32 may include an emblem E2 displayed thereon.

Referring now to FIG. 4A, the plunger assembly 30 is shown having the plunger handle 32 coupled to a rod 80. The rod 80 includes an upper end 80A and a lower end 80B, wherein the upper end 80A is coupled to the plunger handle 32. The lower end 80B includes a screw boss 82 which is configured to couple a filter assembly 84 to the rod 80. As shown in FIG. 4A, the filter assembly 84 includes a compression plate 86 having an outer rim 88 and an inner surface 90, wherein the inner surface 90 includes a number of through apertures 92 and central aperture 94. The apertures 92 are configured to allow fluid to pass therethrough during a filtering process. Central aperture 94 is a mounting aperture used to couple the screw boss 82 to a bottom plate as further described below. The filter assembly 84 further includes a mesh filter 96 which is in the form of a disk filter having a central aperture 98. The mesh filter 96 is contemplated to be a wire screen mesh filter which may have a mesh size of approximately 60 wires per inch. The filter assembly 84 further includes a bottom plate 100 having an outer rim 102, a frame structure 104, and a centrally positioned upstanding mounting member 106 which is configured to threadingly engage the screw boss 82 of rod 80. Thus, in assembly, the mesh filter 96 and compression plate 86 mount on the mounting member 106 of the bottom plate 100 at central apertures 98, 94, respectively. This assembled configuration is shown in FIG. 4B. The filter assembly 84 further includes a silicon seal ring 108 having a body portion 112 and an outer rim 110. In use, the outer rim 110 is configured to seal against the walls of an inner cavity, such that fluid must pass through the filter assembly 84 as the plunger assembly 30 moves downward within the coffee press apparatus 10 in a manner generally known in the art. The seal ring 108 is contemplated to be flexibly resilient, yet rigid enough to sufficiently seal against the inner vessel during a filtering procedure to help ensure that coffee grounds are not allowed to pass through into the brewed coffee produced by the coffee press apparatus 10. The filter assembly 84, as shown in FIGS. 4A and 4B, defines a primary filter for the coffee press apparatus 10. With reference specifically to FIG. 4B, the filter assembly 84 is shown coupled to the lower portion 80B of rod 80, wherein the silicon seal ring 108 is the outermost portion of the filter assembly 84, thereby defining an outer perimeter of the filter assembly 84. The mesh filter 96 is shown through the various apertures 92 disposed in the compression plate 86. Further, the inner frame 104 of bottom plate 100 can also be seen through apertures 92. As shown in FIG. 4B, the apertures 92 can be of varying size and are not contemplated to be limited to any particular size or pattern. It is contemplated that the plunger handle 32 is coupled to rod 80 by threading engagement at the upper end 80A of the rod 80. It is further contemplated that the rod 80 may be a hollow rod.

Figure 4C:
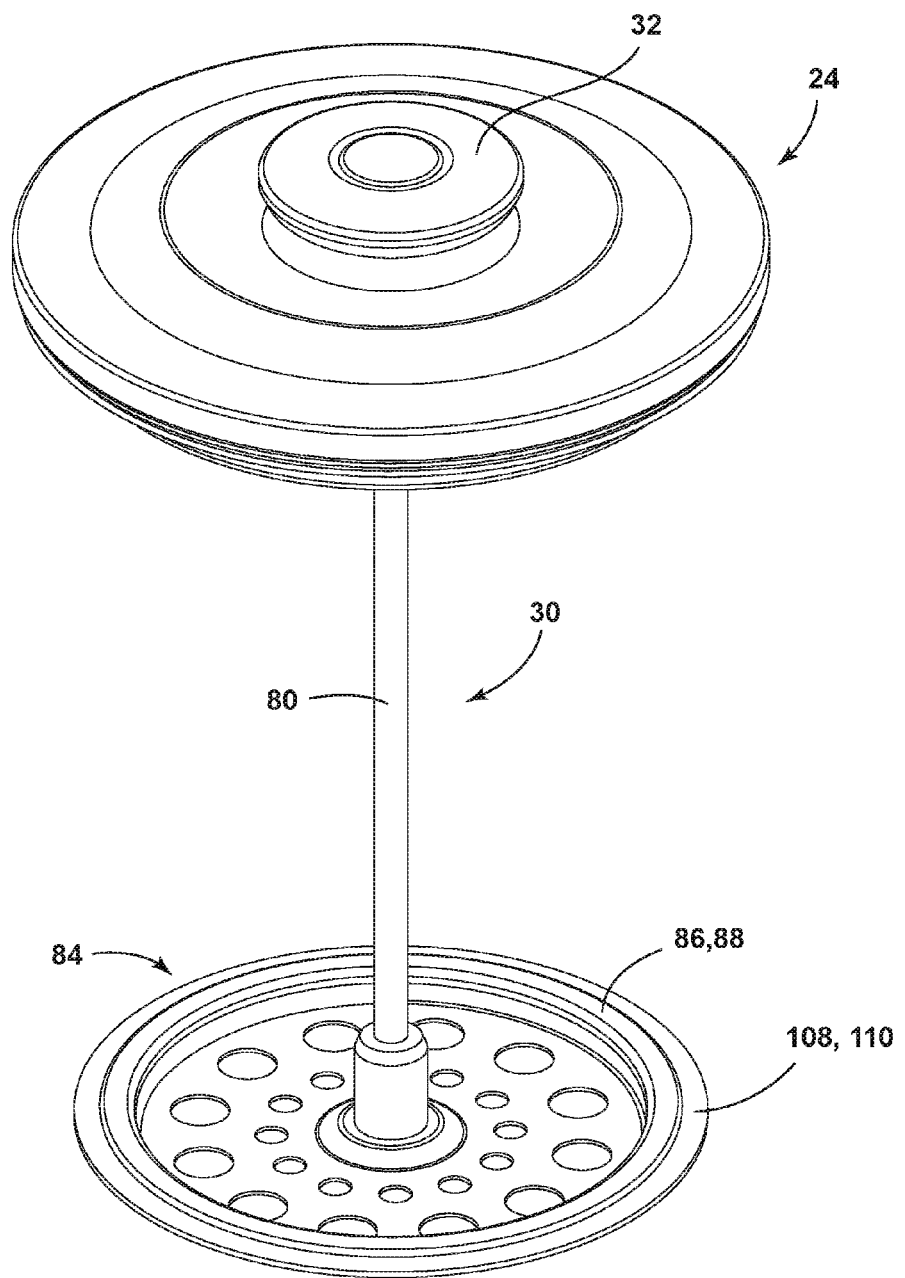
FIG. 4C is a perspective view of a plunger assembly according to another embodiment of the present concept.

Referring now to FIG. 4C, the plunger assembly 30 is shown with the primary filter assembly 84 disposed thereon. In assembly, the plunger assembly 30 is slideably disposed through the lid assembly 24 via rod 80. As further discussed below, the lid assembly 24 is configured to include a secondary filter assembly. In this way, the plunger assembly 30 provides a primary filter in filter assembly 84, and a secondary filter assembly is also provided within the lid assembly 24 of the coffee press apparatus 10, as further described below with reference to FIG. 13.

Figure 5:
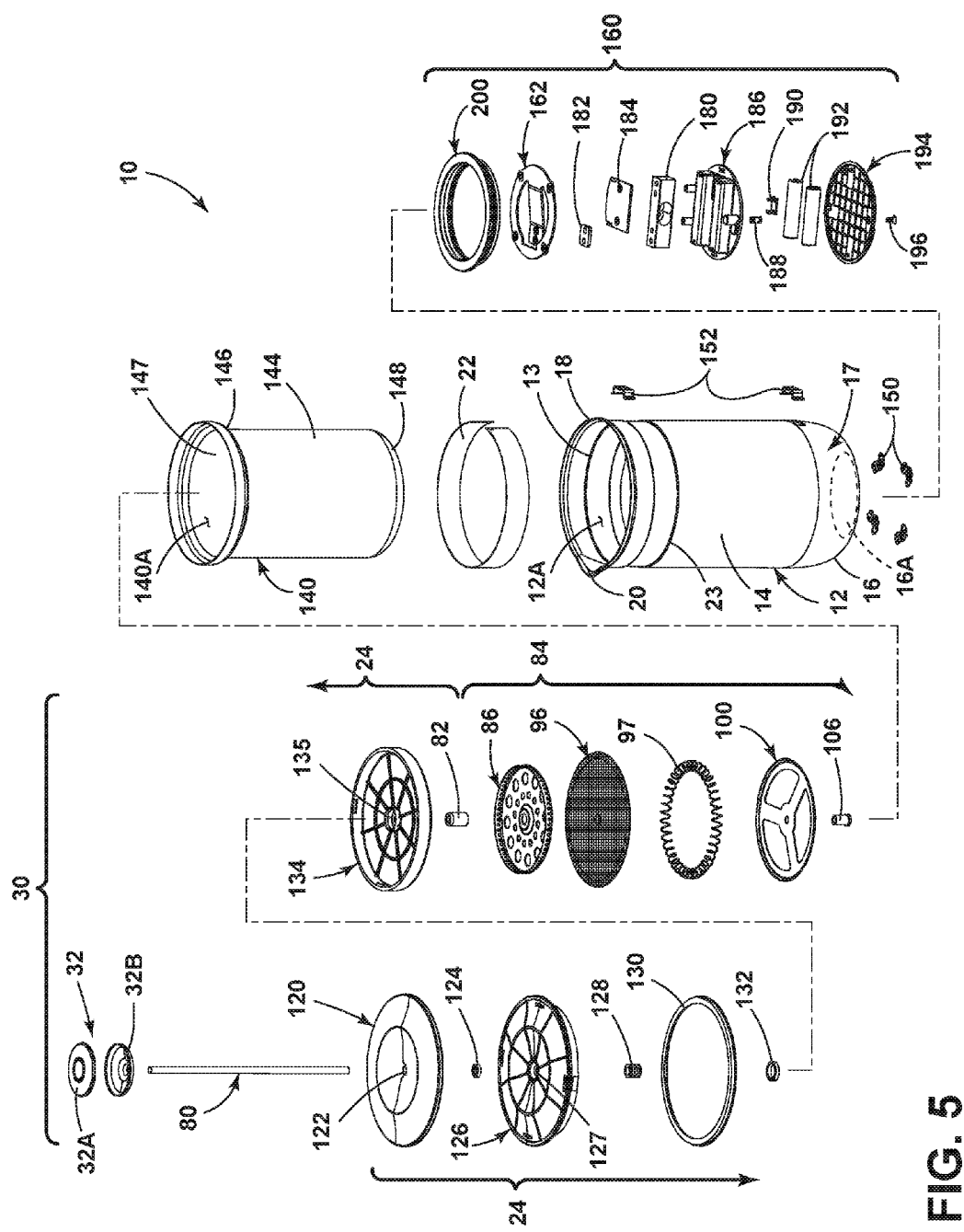
FIG. 5 is an exploded perspective view of the coffee press apparatus of FIG. 1.

Referring now to FIG. 5, an exploded view of the coffee press apparatus 10 is shown. Specifically, the plunger assembly 30 is shown having the handle 32 with upper and lower handle portions 32A, 32B exploded away from rod 80. The lid assembly 24 is shown including a lid housing 120 with a central aperture 122 configured to slidingly receive rod 80. The lid assembly 24 further includes an upper lid portion 126 having a central aperture 127, wherein central aperture 127 is configured to align with central aperture 122 having a seal member 124 disposed therebetween. A standoff member 128 is configured to be disposed between upper lid member 126 and a lower lid member 134. Lower lid member 134 includes a central aperture 135 which is configured to align with a second seal member 132. The lower lid member 134 may further include a filter assembly, as further described below. A seal ring 130 is configured to be disposed between the upper lid member 126 and lower lid member 134 in assembly. In the embodiment shown in FIG. 5, the plunger assembly 30 further includes a primary filter assembly 84 having a compression plate 86, a mesh filter 96, a filter spring 97 and a bottom plate 100. A mounting member 106 is also shown which is configured to threadingly couple to screw boss 82 in assembly. The filter spring 97 may be used in conjunction with, or replaced by, the silicon seal ring 108 shown and described above with reference to FIGS. 4A, 4B.

As further shown in FIG. 5, the outer container 12 is configured to receive an inner vessel 140. The inner vessel 140 includes a body portion or outer sidewall 144 having an upper rim 146 and a bottom wall 148 which generally define a cavity 140A of the inner vessel 140. The inner vessel 140 is contemplated to be comprised of a metallic material, such as stainless steel, and is contemplated to be coupled to the sidewall 14 of the outer container 12. The upper rim 146 defines an opening 147 into the cavity 140A of the inner vessel 140 at upper rim 146 via a weld therebetween. The outer container 12 includes upper rim 18 which defines an opening 13 into an upper cavity 12A of the outer container 12, in which the inner vessel 140 is disposed. The recess portion 23 of sidewall 14 is shown configured to receive trimband 22 thereon. The lower portion 16 of outer container 12 includes a bottom aperture 16A opening into lower cavity 17. Mounting brackets 150 are configured to mount to the bottom wall 148 of inner vessel 140 and are further configured to be accessible through bottom aperture 16A of outer container 12. In assembly, the mounting brackets 150 are used to couple an integrated scale assembly 160 to the bottom wall 148 of the inner vessel 140. Mounting brackets 152 are also shown exploded away from the sidewall 14 of the outer container 12, and are configured, in assembly, to support and couple to the handle assembly 40 (FIG. 1A). The scale assembly 160 is further shown in FIG. 5 and is contemplated to be an integrated scale assembly 160 used to measure the contents of the inner vessel 140, such as coffee grounds and heated water, as further described below. The scale assembly 160 includes a spring plate 162 which is generally coupled to a weighing sensor 180 with an insulating member 182 disposed therebetween. The weighing sensor 180 is electrically coupled with a printed circuit board (PCB) scale 184 which is configured to be electrically coupled with the user interface 60 (FIGS. 2 and 3), as described above. The weighing sensor 180 and PCB scale 184 are coupled to an inner cap 186 which is configured to house a screw boss 188 in assembly. The inner cap 186 is further configured to house a battery source 192 as shown in FIG. 5. A battery cover 194 is configured to couple to the inner cap 186 via a fastener 196 which is configured to thread into screw boss 188 of the inner cap 186. A clip member 190 is further configured to couple the battery cover 194 to the inner cap 186 in assembly along with other twist-lock engagement features described below with reference to FIGS. 11A and 11B. In assembly, the battery cover 194 defines a support base for the coffee press apparatus 10. A flexible sealing member 200 is also shown in FIG. 5 and configured to seal the scale assembly 160 within the lower cavity 17 of the outer container 12 of the coffee press apparatus 10, in assembly. The flexible sealing member 200 is coupled to the support base defined by the battery cover 194, and allows for very slight vertical movement of the coffee press apparatus 10 relative to the battery cover 194, as further described below.

Figure 6:
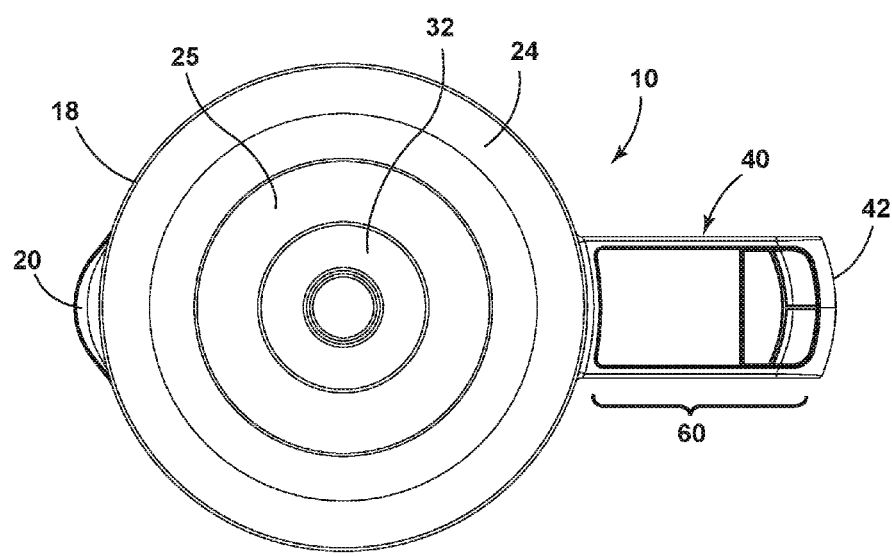
FIG. 6 is a top plan view of the coffee press apparatus of FIG. 1.
Figure 7:
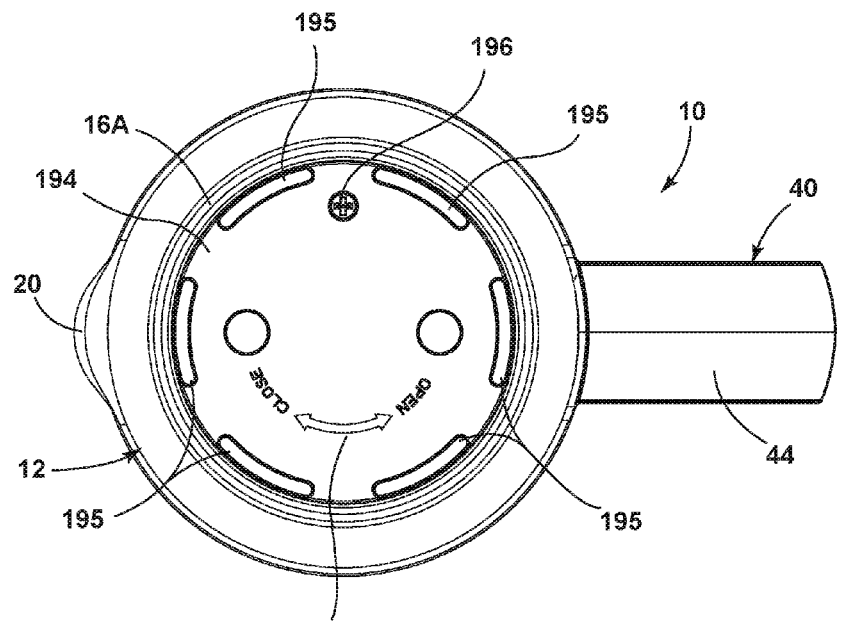
FIG. 7 is a bottom plan view of the coffee press apparatus of FIG. 1.

Referring now to FIGS. 6 and 7, the coffee press apparatus 10 is shown from a top view (FIG. 6) and further shown from a bottom view (FIG. 7). With specific reference to FIG. 7, the battery cover 194 is shown having fastener 196 coupled thereto to hold the battery cover 194 in place below bottom aperture 16A of outer container 12. The battery cover 194 further includes a number of feet 195 disposed thereon, wherein it is contemplated that the feet 195 may be rubberized feet configured to provide grip for the coffee press apparatus 10 in use. It is further contemplated that the battery cover 194 may engage inner cap 186 of the scale assembly 160 in a twist-lock engagement. The battery cover 194 further includes indicia 197 for instructing a user how to open and close the battery cover 194 with respect to inner cap 186 once fastener 196 has been removed. The battery cover 194 defines a support base for the coffee press apparatus 10, such that the feet 195 are configured to support the coffee press apparatus 10 in an upright orientation from a support surface.

Figure 8A:
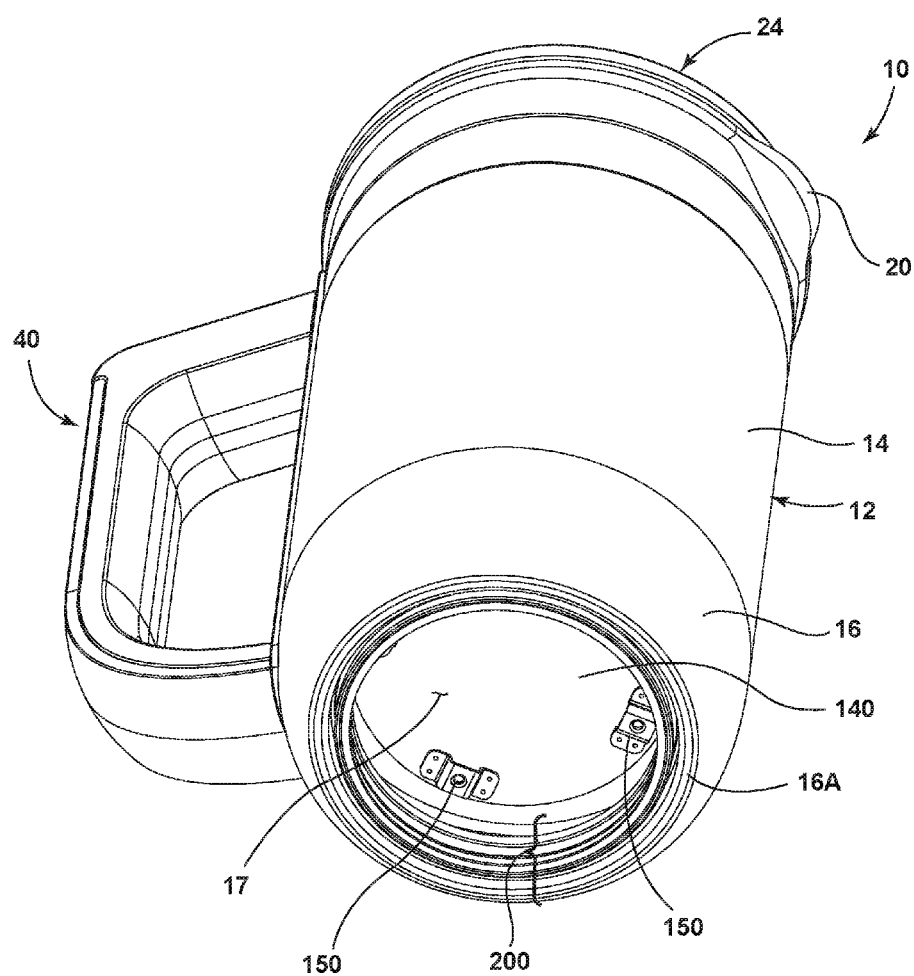
FIG. 8A is a bottom perspective view of the coffee press apparatus of FIG. 1 with an integrated scale removed to reveal a lower cavity of an outer container.

Referring now to FIG. 8A, the coffee press apparatus 10 is shown having the battery cover 194 removed therefrom, such that lower cavity 17 of the outer container 12 is shown through lower aperture 16A of the outer container 12. In FIG. 8A, the scale assembly 160, shown in FIG. 5, is removed from the lower cavity 17. With the scale assembly 160 and battery cover 194 removed, the bottom wall 148 of inner vessel 140 is shown having mounting brackets 150 disposed thereon. As further shown in FIG. 8A, the flexible sealing member 200 extends below or through the lower aperture 16A, such that the outer container 12 essential floats on the flexible sealing member 200 in an upright configuration, such as shown in FIG. 1A.

Figure 8B:
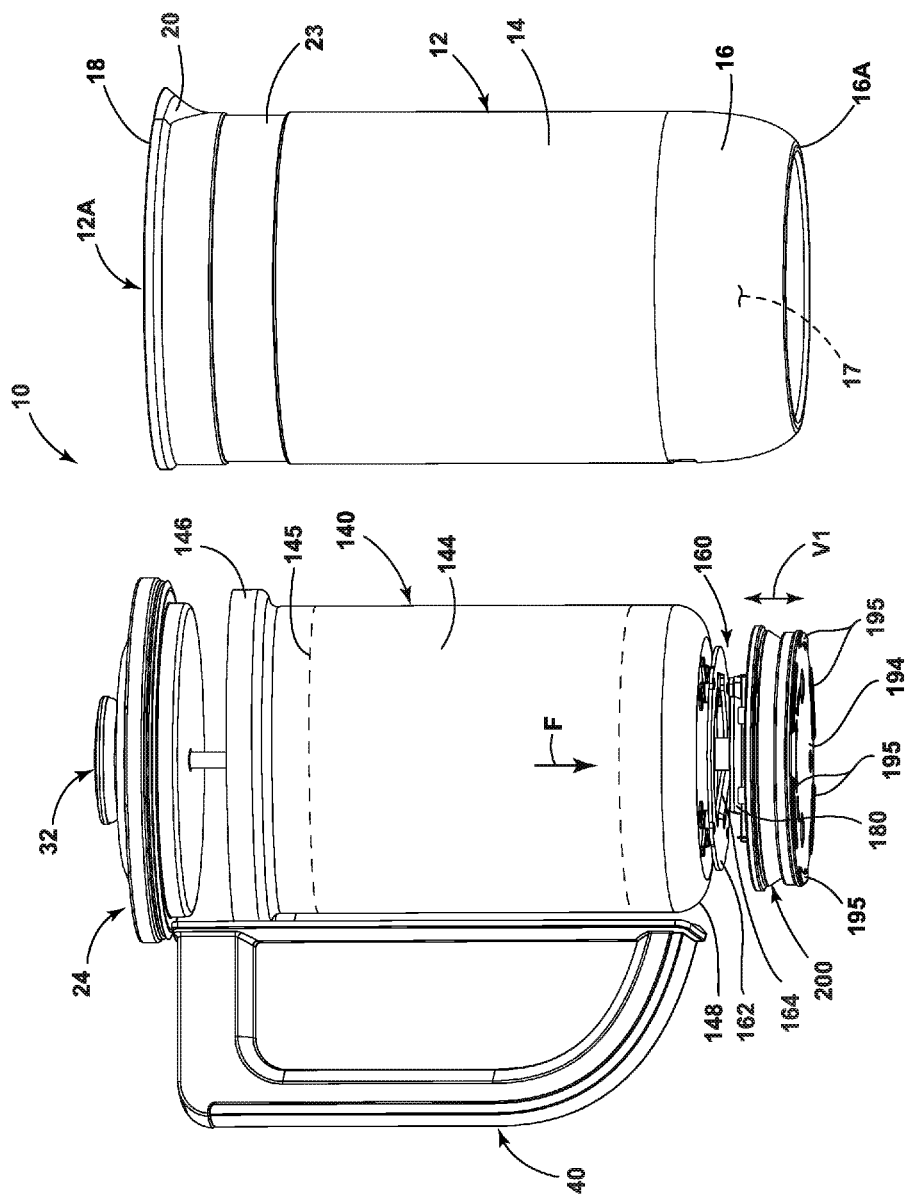
FIGS. 8B and 8C are perspective views of the coffee press apparatus of FIG. 1 showing the outer container exploded away from the apparatus to reveal an inner vessel.
Figure 8C:
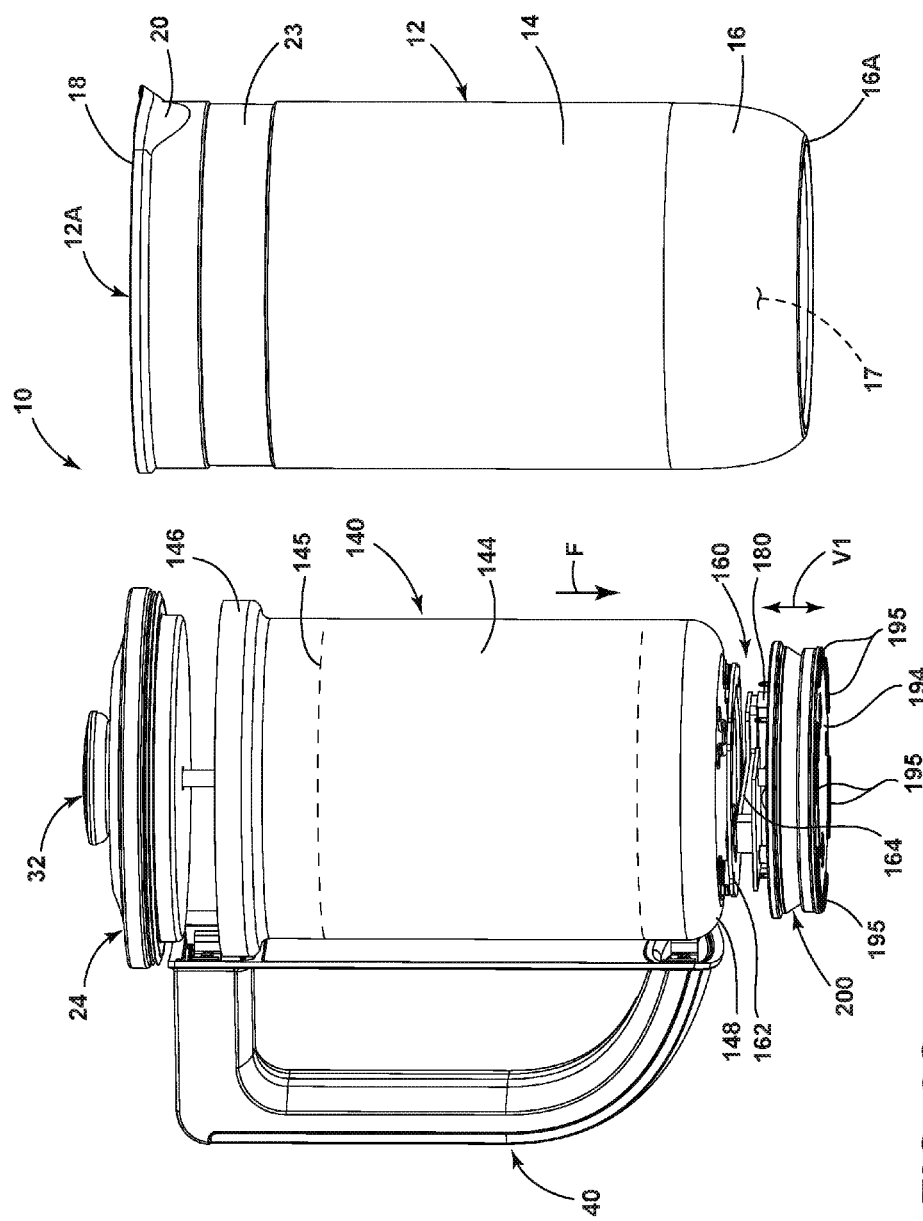

Referring now to FIGS. 8B and 8C, the coffee press apparatus 10 is shown with the outer container 12 exploded away therefrom to reveal the inner vessel 140. As shown in FIGS. 8B and 8C, the scale assembly 160 is coupled to the bottom wall 148 of the inner vessel 140. The inner vessel 140 further includes a maximum fill line 145 embossed on the body portion 144 of the inner vessel 140. The spring plate 162 of the scale assembly 160 is shown coupled to the bottom wall 148 of the inner vessel 140 having a spring finger 164 operably coupled to the weighing sensor 180. The spring finger 164 of spring plate 162 is configured to support the inner vessel 140 as coupled to the outer container 12 in a floating arrangement, such that the outer container 12 and inner vessel 140 can move vertically in a direction as indicated by arrow V1 as the spring plate 162 is compressed and the flexible sealing member 200 is also compressed. This vertical movement is contemplated to be a very slight vertical movement, such that the scale assembly 160 is a micro-scale configured to weigh the contents of the inner vessel 140, as the inner vessel 140 and outer container 12 exert a downward force on the spring plate 162 and flexible sealing member 200. This downward force, indicated by arrow F1, is increased ever so slightly as dry ingredients, such as coffee grounds, are added to the inner vessel 140. The force F1 is increased in a more notably manner when the inner vessel 140 is filled with a volume of fluid, such as heated water, in a brewing procedure. Thus, the addition of contents to the inner vessel 140 compresses both the spring plate 162 and flexible sealing member 200 of the scale assembly 160, and the contents are weighed by the scale assembly 160, as further described below.

Figure 9:
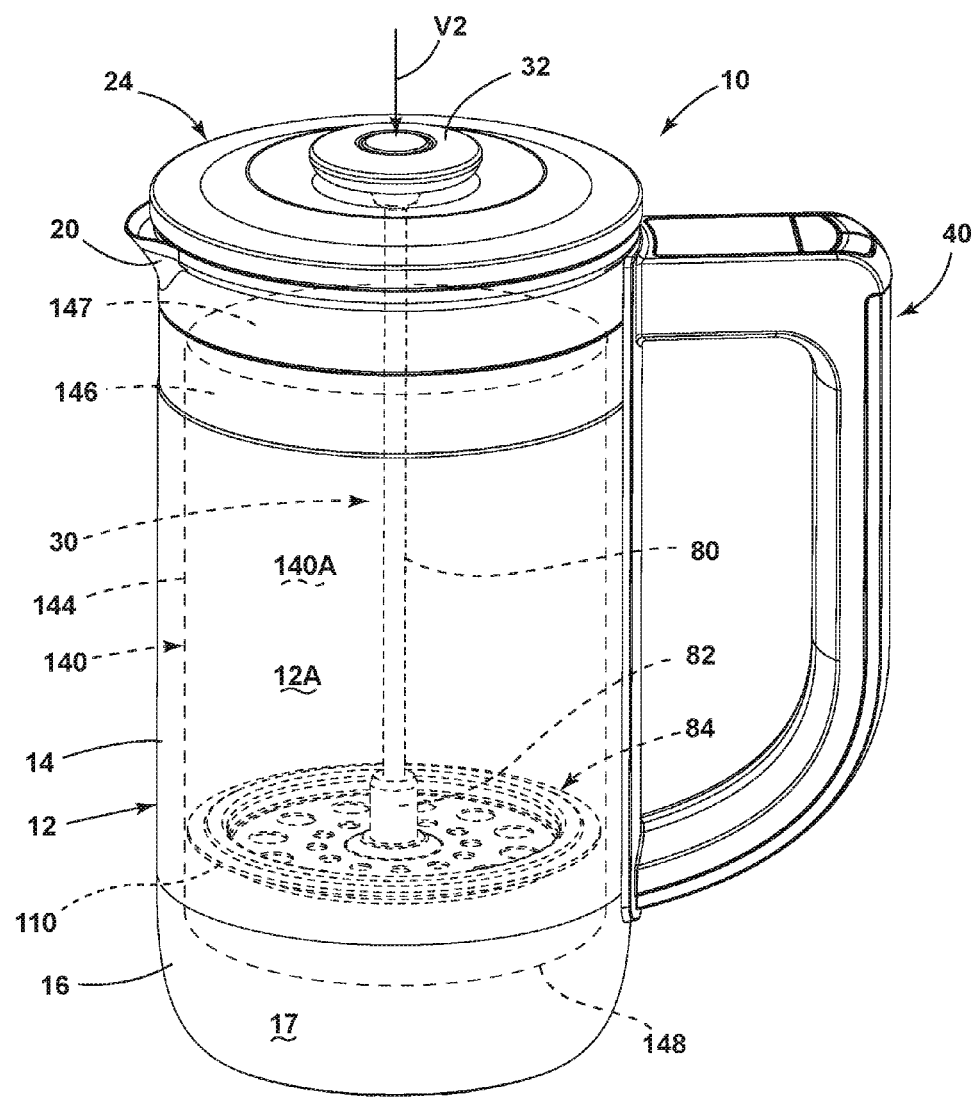
FIG. 9 is a perspective view of the coffee press apparatus of FIG. 1 showing a plunger assembly and inner vessel in phantom.

Referring now to FIG. 9, the plunger assembly 30 is shown in a lowered position within inner vessel 140 which is shown in phantom within outer container 12. As further described below, the inner vessel 140 is configured to receive ingredients, such as coffee grounds or tea and heated water to make a brewed beverage, which is filtered by plunger assembly 30, using primary filter assembly 84 when a user plunges the plunger assembly 30 via handle 32 within cavity 140A of inner vessel 140 in a vertical direction as indicated by arrow V2. As the plunger assembly 30 moves in the direction as indicated by arrow V2 from a raised position to a lowered position, the primary filter assembly 84 filters the heated water and ingredients, such that the area above the primary filter assembly 84 of cavity 140A of inner vessel 140 primarily includes a brewed beverage that has been filtered. The coffee press apparatus 10 of the present concept is contemplated to provide a filtered brewed beverage, such as coffee or tea, however, the coffee press apparatus 10 of the present concept may also be used to make any other beverage contemplated by a user. The beverage may be a hot or cold beverage and is described herein as a hot brewed coffee beverage as an exemplary option only.

Figure 10A:
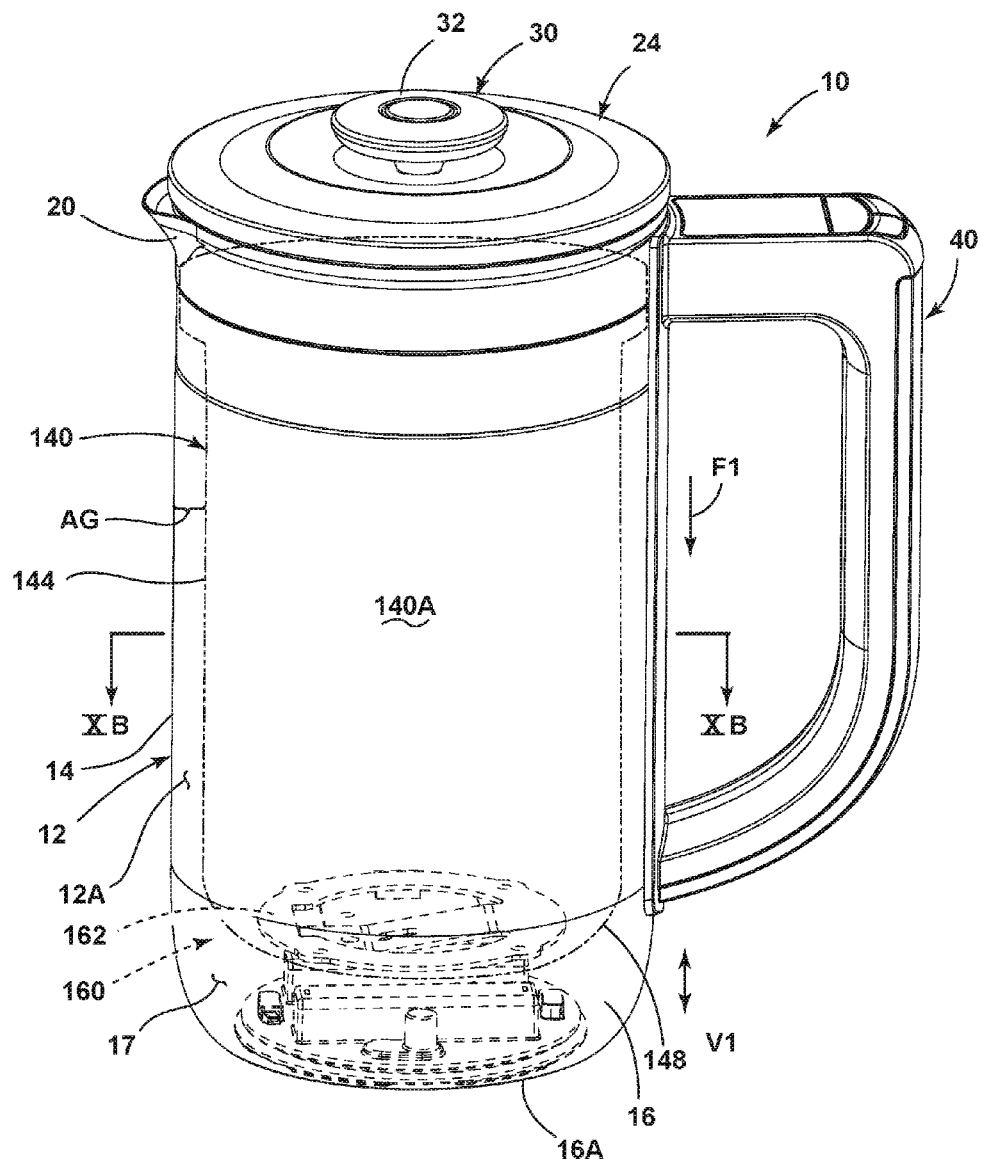
FIG. 10A is a perspective view of the coffee press apparatus of FIG. 1 showing an inner vessel and integrated scale in phantom.
Figure 10B:
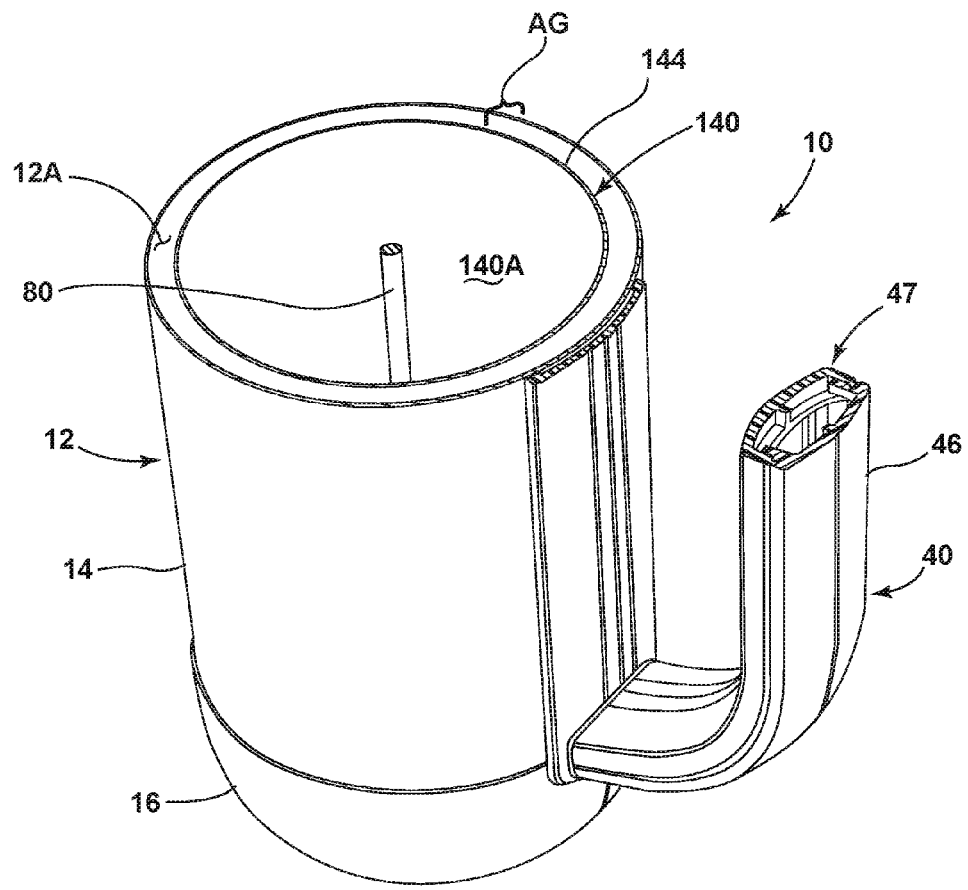
FIG. 10B is a cross-sectional perspective view of the coffee press apparatus of FIG. 10A taken along line XB.
Figure 12B:
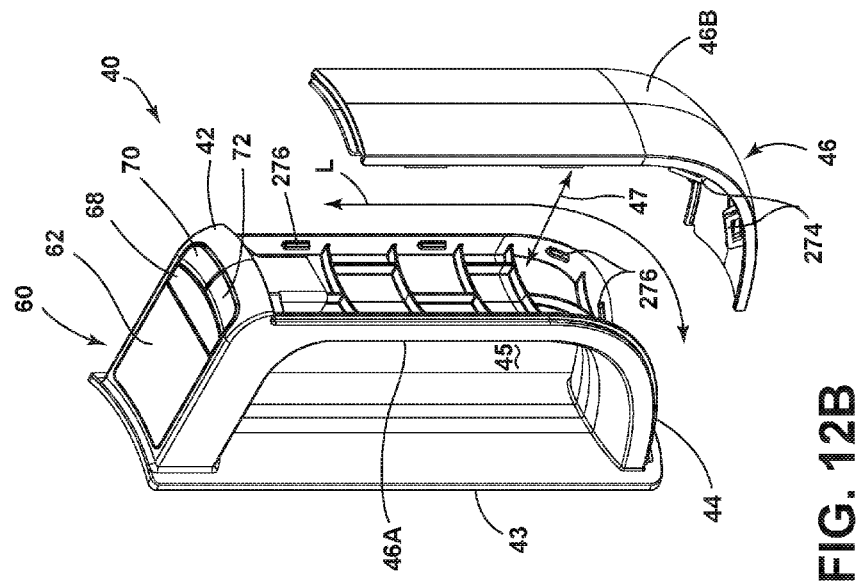
FIG. 12B is top perspective view of the handle assembly of FIG. 12A as assembled having a handle cover exploded away therefrom.

Referring now to FIG. 10A, inner vessel 140 is shown disposed in the upper cavity 12A of outer container 12 as coupled thereto. The inner vessel 140 is further coupled to the scale assembly 160 via the coupling of spring plate 162 to the bottom wall 148 of the inner vessel 140. In this way, the inner vessel 140 and the outer container 12 are supported in a floating manner by the scale assembly 160. Again, the spring plate 162 and flexible sealing member 200 are compressible in a vertical direction as indicated by arrow V1. As shown in FIG. 10A, the scale assembly 160 is disposed within the lower cavity 17 of the outer container 12, such that the scale assembly 160 is an integrated scale assembly with the coffee press apparatus 10. The scale assembly 160 is configured to weigh an amount of ground coffee (or other like ingredients) and also weigh an amount of hot water added to the cavity 140A of inner vessel 140, as further described below. As shown in FIG. 10A, and as further shown in FIG. 10B, the sidewall 14 of the outer container 12 is spaced-apart from the body portion or sidewall 144 of the inner vessel 140 to define an air gap AG therebetween. The air gap AG may be an empty air gap, or may include an insulating material. In assembly, the air gap AG serves to insulate the sidewall 14 of the outer container 12 from the heated contents of the inner vessel 140. In this way, the outer container 12 remains cool to the touch when hot water or brewed coffee is disposed within the inner vessel 140. FIG. 10B is a cross-sectional view of the coffee press apparatus 10 taken along line XB of FIG. 10A. As shown in FIG. 10B, the air gap AG fully surrounds the outer sidewall or body portion 144 of the inner vessel 140 in relation to sidewall 14 of outer container 12. Also shown in FIG. 10B, the handle assembly 40 includes an internal raceway 47 disposed through handle member 46 which, in assembly, is configured to open into the lower cavity 17 of outer container 12 and extend upwardly to the user interface 60 disposed on the handle assembly 40 (FIG. 2). In this way, the internal raceway 47 is configured to include electrical leads for powering the user interface 60 via the battery source 192, as well as establish communication between the user interface 60 and the scale assembly 160. Thus, the electrical leads, identified by the letter "L" in FIG. 12B, are used to electrical connect the user interface 60 (FIG. 2) with the integrated scale 160, such that weight information from the weighing sensor 180 can be signaled to the user interface 60 and displayed on the display screen 62 of the user interface 60.

Figure 11A:
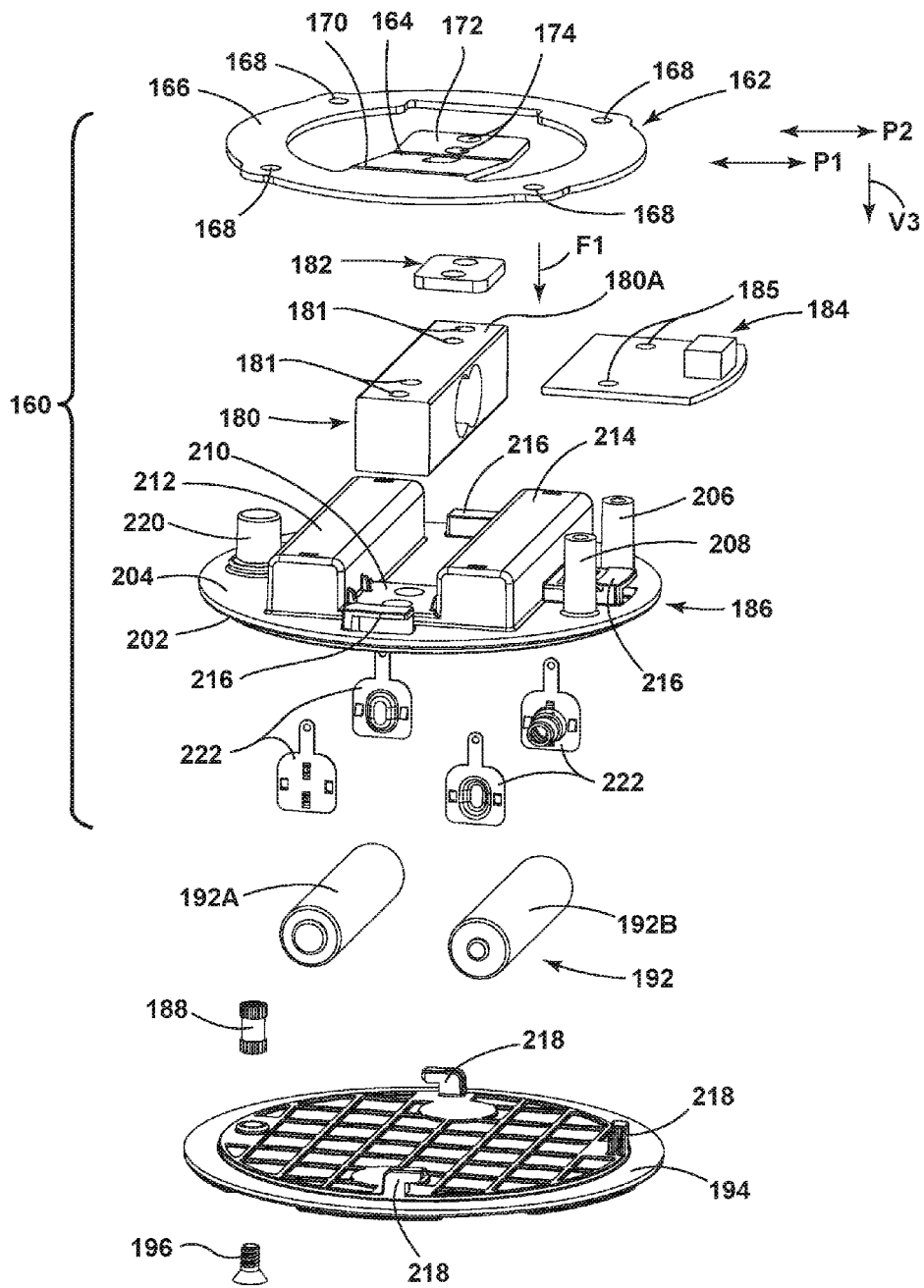
FIG. 11A is an exploded top perspective view of a scale assembly.

Referring now to FIG. 11A, the scale assembly 160 is shown in an exploded view. As noted above, the scale assembly 160 includes a spring plate 162 having a spring finger 164 coupled to an outer rim 166. The outer rim 166 includes mounting apertures 168 which are configured to receive fasteners for coupling the spring plate 162 to mounting brackets 150 disposed on the bottom wall 148 of the inner vessel 140. The spring finger 164 is a flexibly resilient spring finger having an angled portion 170 connected to a mounting portion 172, such that the mounting portion 172 defines a generally horizontal plane P1 which is spaced away from a plane P2 defined by outer rim 166. The spring finger 164 is configured to flex as ingredients are added to the inner vessel 140. As weight is added to the inner vessel 140, it is contemplated that the spring plate 162 will move downward vertically at outer rim 166 towards weighing sensor 180 in a direction as indicated by arrow V3, thereby moving plane P2 towards plane P1 as the inner vessel 140 is loaded and the spring plate 162 compresses. As noted above, the spring plate 162 compresses along with flexible sealing member 200, for a combined downward movement in the direction indicated by arrow V1 (FIGS. 8B and 8C), as the inner vessel 140 is filled.

Thus, as weight is added to the inner vessel 140, the spring finger 164 is configured to flex and transfer the downward force F1 from the coffee press apparatus 10 to the weighing sensor 180, such that a weight of the contents deposited into the inner vessel 140 can be weighed by the PCB scale 184. As further shown in FIG. 11A, the weighing sensor 180 includes mounting apertures 181 which are configured to mount the insulating member 182 thereon. The insulating member 182 is configured to be comprised of a material that is highly heat resistant, thereby demonstrating a low thermal conductivity. In this way, the insulating member 182 is configured to resist heat transfer from the spring plate 162 to the weighing sensor 180, thereby protecting the weighing sensor 180 from excessive heat in use. For example, the inner vessel 140 may be filled with a hot water mixture that would transfer heat from the mounting brackets 150 (FIG. 5) to the spring plate 162. The insulating member 182 will insulate the weighing sensor 180 from substantial heat transfer that could be realized at the spring plate 162 at mounting portion 172. The mounting apertures 181 of the weighing sensor 180 are further configured to mount the weighing sensor 180 to the inner cap 186. Essentially, the inner cap 186 defines a base plate 202 having an upper surface 204 with a plurality of structural features extending upwardly therefrom. The structural features include first and second mounting bosses 206, 208 which are configured to receive fasteners through mounting apertures 185 disposed through PCB scale 184, to mount the PCB scale 184 to the inner cap 186. The first and second mounting bosses 206, 208 are further configured to be standoff features which help to prevent an overload condition from damaging the weighing sensor 180. The first and second mounting bosses 206, 208 extend upwardly beyond a top surface 180A of the weighing sensor 180, such that if an overload condition is realized in the inner vessel 140, the outer rim 166 of the spring plate 162 will abut the first and second mounting bosses 206, 208 either directly, or through the PCB scale 184. In this way, the downward movement of the spring plate 162 in the direction as indicated by arrow V3 can be limited to the height of the first and second mounting bosses 206, 208. Further, it is contemplated that other such structures can extend upwardly from the upper surface 204 of base plate 202 of the inner cap 186 to prevent an overload situation realized at the spring plate 162. An overload condition may occur when the contents of the inner vessel 140 are too much for the scale assembly 160, or may further include a plunging procedure, using the plunger assembly 30, providing an overload force in the direction indicated by arrow F1 to the weighing sensor 180 as a user plunges the plunger assembly 30 to filter a beverage. In this way, the first and second mounting bosses 206, 208, or other like abutment features disposed on the base plate 202, can act as a hard stop for the spring plate 162, thereby limiting the floating movement of the inner vessel 140 along the path indicated by arrow V1 (FIG. 8C). In this way, the first and second mounting bosses 206, 208, or other like abutment features disposed on the base plate 202 define an overload protection feature protecting the weighing sensor 180 from an overload situation. An overload protection feature is also created by the outer container 12. The outer container 12 will abut a support surface at lower aperture 16A if the spring plate 162 and flexible sealing member 200 compress to such a degree in an overload situation.

As further shown in FIG. 11A, the base plate 202 includes a mounting pad 210 for mounting the weighing sensor 180 thereto in assembly. The mounting pad 210 as shown in the embodiment of FIG. 11A, is disposed between battery housings 212, 214. The base plate 202 further includes a plurality of engagement features 216 disposed on a periphery thereof. The engagement features 216 are configured to engage reciprocal engagement features 218 disposed on the battery cover 194. In this way, the engagement features 216 of inner cap 186 are configured to receive engagement features 218 of battery cover 194 in a twist-lock arrangement which is mechanically retained via fastener 196 being mounted to screw boss 188 which is housed in screw boss housing 220 disposed on the base plate 202. As noted above, the user interface 60 (FIG. 2) and scale assembly 160 are contemplated to be run by a battery source 192 which, as shown in FIG. 11, may include first and second batteries 192A, 192B. It is contemplated that these batteries 192A, 192B may be AA or AAA size batteries, however, it is contemplated that any battery source sufficient to power the coffee press apparatus 10 of the present concept can be used, such that the batteries 192A, 192B shown in FIG. 11A are not meant to limit the scope of the present concept. Battery contacts 222 are shown exploded away from the inner cap 186 and are configured to be received at opposite ends of the battery housings 212, 214, in which batteries 192A, 192B are also disposed in assembly.

Figure 11B:
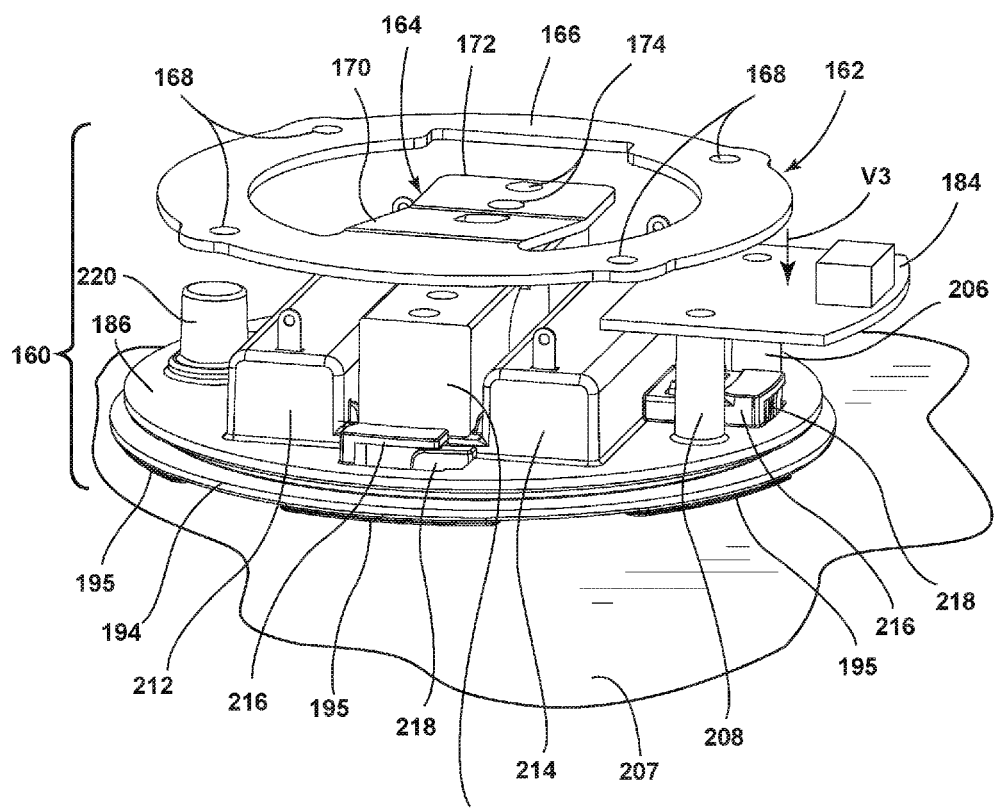
FIG. 11B is a perspective view of the scale assembly of FIG. 11A as assembled.

Referring now to FIG. 11B, the scale assembly 160 is shown in an assembled condition with the engagement features 218 of the battery cover 194 coupled to the engagement features 216 of the inner cap 186. Further, the spring plate 162 is shown with the outer rim 166 disposed over mounting boss 208, such that mounting boss 208 will serve as an abutment member to protect the weighing sensor 180 from an overload condition, as mounting boss 208 will limit the vertical movement of the outer rim 166 of spring plate 162 in the direction as indicated by arrow V3 via an abutment of the outer rim 166 with the mounting boss 208. As noted above, the battery cover 194 defines a support base for the coffee press apparatus 10, such that the feet 195 are configured to support the coffee press apparatus 10 in an upright orientation from a support surface, such as support surface 207 shown in FIG. 11B.

Figure 11C:
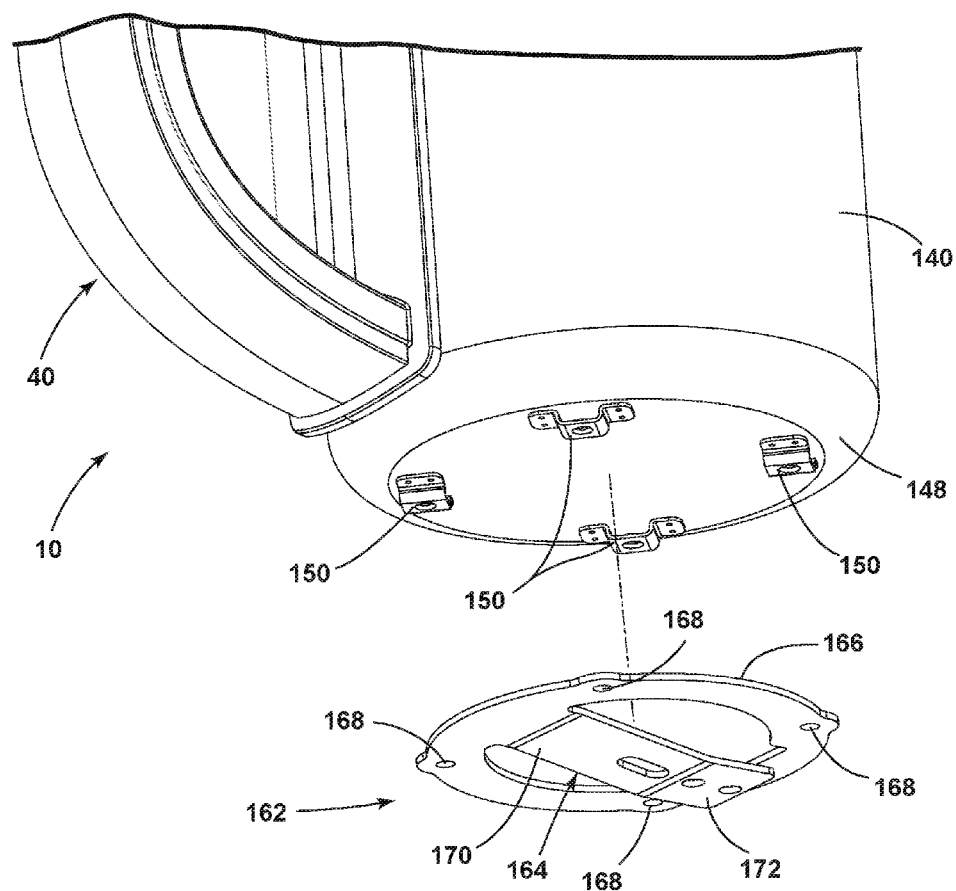
FIG. 11C is a fragmentary bottom perspective view of an inner vessel having a spring plate exploded away therefrom.

Referring now to FIG. 11C, the spring plate 162 is shown exploded away from inner vessel 140. The inner vessel 140 is shown having bottom wall 148 with mounting brackets 150 coupled thereto. The spring plate 162 includes outer rim 166 with mounting apertures 168 disposed therethrough. In assembly, the mounting apertures 168 are configured to align with the mounting brackets 150 disposed on the bottom wall 148 of the inner vessel 140 for coupling via a fastener thereto.

Figure 12A:
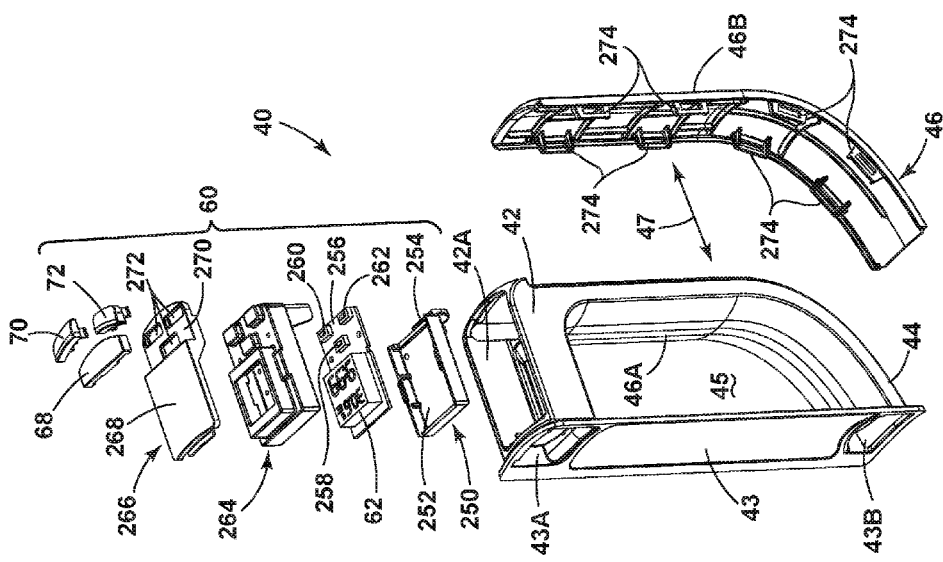
FIG. 12A is an exploded top perspective view of a handle assembly.

Referring now to FIGS. 12A and 12B, the handle assembly 40 is shown having user interface 60 disposed at an upper portion 42 thereof. With specific reference to FIG. 12A, the handle assembly 40 includes a handle member 46 which includes inner handle portion 46A and outer handle cover 46B. An internal raceway 47 is defined therebetween, as best shown in FIG. 10B. The handle assembly 40 further includes upper portion 42 and lower portion 44 which outwardly extend from a base plate 43 to define a handle recess 45 therebetween. The base plate 43 includes upper and lower apertures 43A, 43B which are used to receive mounting members 152 (FIG. 5) for mounting the handle assembly 40 to the outer container 12. Lower aperture 43B is further used to connect internal raceway 47 to the lower cavity 17 of the outer container 12, such that a lead L (FIG. 12B) can electrically couple the user interface 60 with the integrated scale assembly 160 as shown and described above. The lead L may include any number of wires used to sufficiently connect the user interface 60 with the scale assembly 160, as well as supply power to the scale assembly 160 and the user interface 60 from the battery source 192. The upper portion 42 defines a cavity 42A in which components of the user interface 60 are housed in assembly. The components of the user interface 60 include an LCD bracket 250 having a tray portion 252 and a downwardly extending mounting tab 254. In assembly, the mounting tab 254 is configured to couple the LCD bracket 250 to the handle assembly 40 at the upper portion 42 thereof. In assembly, a user interface PCB 256 includes a plurality of contacts 258, 260, 262 which are configured to align with buttons 68, 70, 72 in assembly. The user interface PCB 256 is configured to process inputs from the user via buttons 68, 70, 72 and is further configured to process signal information received from the integrated scale assembly 160 through lead L. The user interface PCB 256 is configured to receive weight information from the integrated scale assembly 160 and display this information on display screen 62 which is coupled to the user interface PCB 256. A silica gel cover 264 is configured to be received over the user interface PCB 256 and display screen 62 in assembly. The user interface 60 further includes a cover 266 having a transparent display screen cover 268 and a landing portion 270. The landing portion 270 includes apertures 272, through which contacts 258, 260 and 262 interface with buttons 68, 70 and 72, respectively. With specific reference to FIG. 12B, the outer handle cover 46B includes clips 274 which are configured to engage tabs 276 disposed on the inner handle portion 46A to mount the outer handle cover 46B to the handle assembly 40, thereby defining the internal raceway 47 therebetween. In use, the user interface 60 provides a user with a platform for operating the coffee press apparatus 10 of the present concept, as further described below. It is noted that the user interface 60 is turned on by a user pressing the on/off button 68. The user interface 60 of the coffee press apparatus 10 is configured to automatically shut off after a select time period of inactivity.

Figure 13:
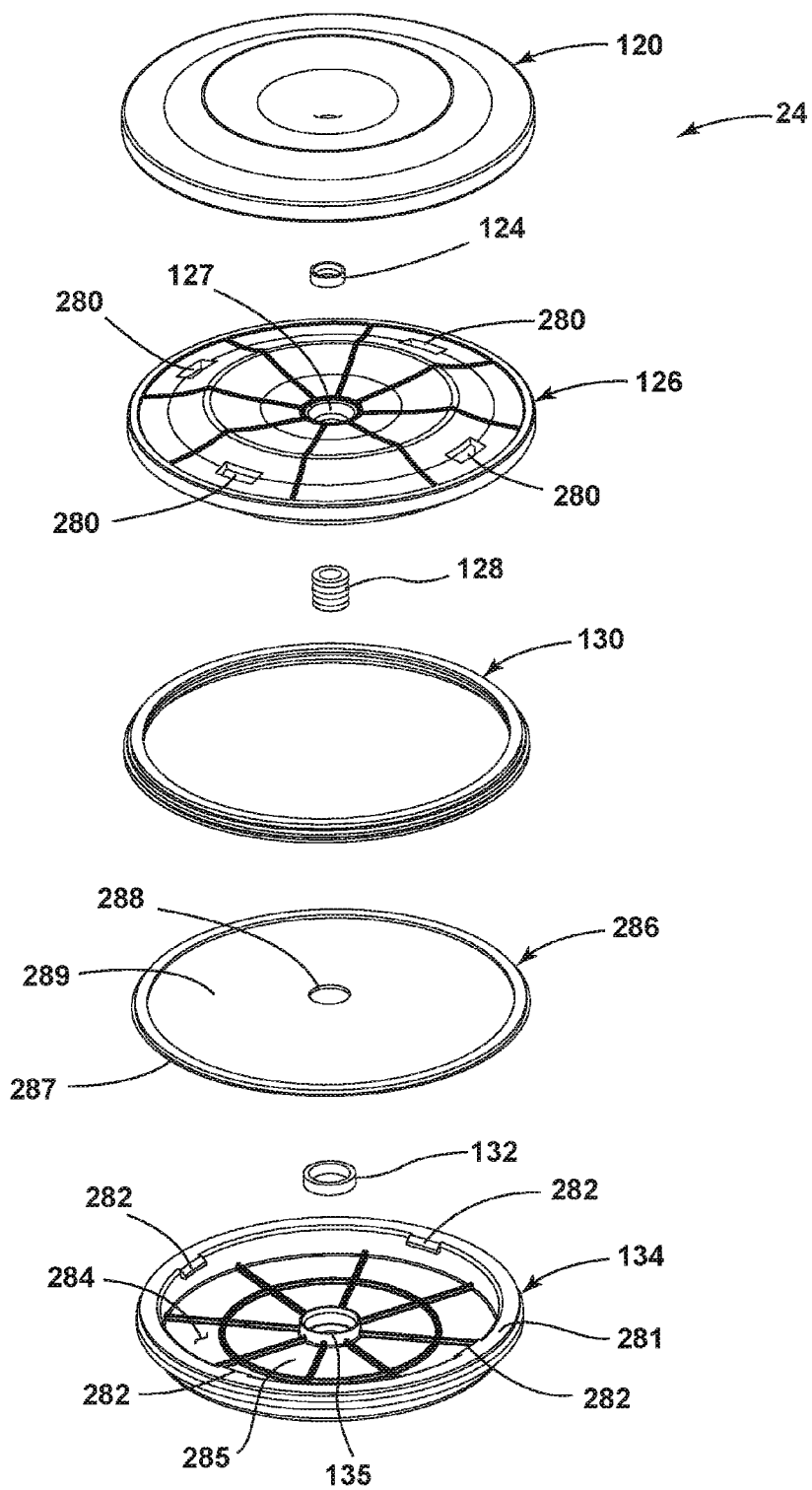
FIG. 13 is an exploded top perspective view of a lid assembly.

Referring now to FIG. 13, the lid assembly 24 is shown having a lid housing 120 with a central aperture 122 configured to slidingly receive rod 80 of the plunger assembly 30 (FIG. 4B). The lid assembly 24 further includes an upper lid member 126 having a central aperture 127, wherein central aperture 127 is configured to align with central aperture 122 having a seal member 124 disposed therebetween. A standoff member 128 is configured to be disposed between upper lid member 126 and a lower lid member 134. Lower lid member 134 includes a central aperture 135 which is configured to align with a second seal member 132. A seal ring 130 is configured to be disposed between the upper lid member 126 and lower lid member 134 in assembly. In the embodiment shown in FIG. 13, the lid assembly 24 further includes apertures 280 disposed through upper lid member 126. The apertures 280 of upper lid member 126 are configured to align with clips 282 disposed on an outer rim 281 of lower lid member 134. In this way, the upper lid member 126 is configured to releasably couple to the lower lid member 134 in assembly. As shown in FIG. 13, lower lid member 134 generally includes a cavity 284, in which a filter assembly 286 can be received. The filter assembly 286, shown in FIG. 13, is in the form of a disk filter having a central aperture 288. The filter assembly 286 includes an outer rim 287 and a mesh filter 289 which is contemplated to be a wire mesh filter which may include a mesh size of approximately 60 wires per inch in a manner similar to mesh filter 96 described above with reference to FIG. 5. In assembly, the filter assembly 286 is received within the cavity 284 of lower lid member 134 with central aperture 288 aligned with central aperture 135 of lower lid member 134. Lower lid member 134 is contemplated to have a porous bottom wall 285 disposed within the inner vessel 140 and adjacent to the spout 20 of the outer container 12. In this way, fluid can pass through the bottom wall 285 of the lower lid member 134 from the inner vessel 140, and then through filter assembly 286 as the contents of the inner vessel 140 of the coffee press apparatus 10 are poured through spout 20 of outer container 12. In this way, the lid assembly 24 defines a secondary filter assembly for filtering the contents of inner vessel 140 after these contents have been initially filtered by the primary filter assembly 84 of plunger assembly 30, in a manner as described above with reference to FIGS. 4A-4C. Having a primary filter assembly in the plunger assembly 30, and a secondary filter assembly in the lid assembly 24, the coffee press apparatus 10 of the present concept is configured to deliver a double filtered beverage to a user that has been filtered in two forms to help ensure that undesired debris is not included in a user's beverage. As noted above, the upper lid member 126 and lower lid member 134 are releasably coupled to one another, such that a user can easily separate the two members and replace the filter assembly 286 with a filter assembly desired by the user. The filter assembly 286 can be a reusable filter assembly with a metal wire mesh, or may be a disposable paper filter assembly. Regardless of the type of filter assembly used, the user can select a filter assembly that suits their needs with respect to the level of filtration desired.

Figure 14:
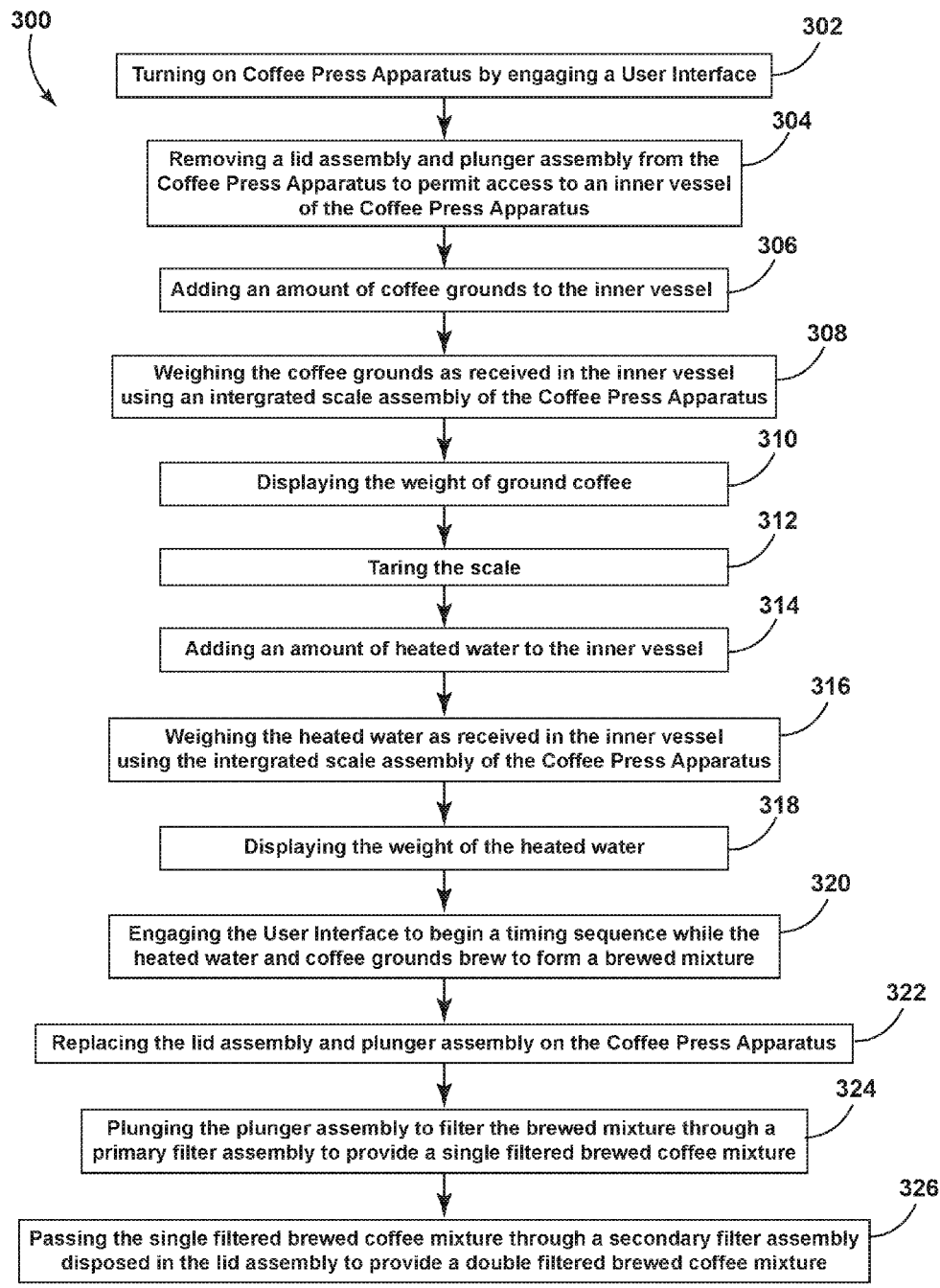
FIG. 14 is a flow chart diagramming a method of preparing an amount of brewed coffee according to an aspect of the present concept.

The process of using the user interface 60 to operate the coffee press apparatus 10 of the present concept will now be described with specific reference to FIG. 14. As shown in FIG. 14, a method 300 of using the coffee press apparatus 10 of the present concept to prepare a brewed coffee beverage is shown as a series of steps 302-326. The steps 302-326 of the method 300 shown in FIG. 14 are contemplated to be exemplary of one way of using the coffee apparatus 10 to prepare a brewed coffee beverage, and are not meant to limit the use of the coffee press apparatus 10 to any specific beverage making process, any specific steps, nor a specific chronology or sequence of steps. The component parts of the coffee press apparatus 10 used herein to describe the method 300 of making a beverage are contemplated to be the same or similar to the component parts described above with reference to FIGS. 1A-13. For purposes of the exemplary method 300, a brewing procedure for making a hot coffee beverage will be described.

As shown in FIG. 14 the method 300 of using the present apparatus generally includes the step of turning on the coffee press apparatus by pressing a power button of a user interface in step 302. A lid assembly and plunger assembly are removed from the coffee press apparatus to permit access to an inner vessel of the coffee press apparatus in step 304. Once access to the inner vessel of the coffee press apparatus is obtained, the user will then add an amount of coffee grounds to the inner vessel in step 306. The coffee grounds, as received in inner vessel, are then weighed using an integrated scale assembly of the coffee press apparatus in step 308. The weight of the coffee grounds is signaled from the integrated scale to the user interface for displaying the weight of the coffee grounds on a display screen of the user interface in step 310. This weighing procedure is contemplated to be an automatic weighing procedure as the scale and user interface will be prepared to weigh the coffee grounds once the coffee press is powered on. As noted above, the weight of the coffee grounds can be displayed in either grams of ounces. The integrated scale assembly is then zeroed-out or tared by the user by pressing a scale button on the user interface in step 312. Ounce tared, the display screen will indicate that the contents of the inner vessel are not factored into the next weighing procedure. The user will then add an amount of heated water to the inner vessel in a ratio commensurate with the amount of ground coffee previously added to the inner vessel in step 314. The heated water, as received in inner vessel, is then weighed using the integrated scale assembly of the coffee press apparatus in step 316. The weight of the heated water is signaled from the integrated scale to the user interface for displaying the weight of the heated water on a display screen of the user interface in step 318. When the amount of heated water appears to be commensurate in ratio to the amount of coffee grounds previously added, the user will then press a clock button of the user interface to begin a timing sequence while the heated water and coffee grounds brew to form a brewed mixture in step 320. During the timing sequence, the user can stir the contents of the inner vessel to augment the brewing process. At a point during the timing sequence of the user's choosing, the user will replace the lid assembly and plunger assembly on the coffee press apparatus in step 322. The user will then plunge the plunger assembly to filter the brewed mixture through a primary filter disposed on the plunger assembly to provide a single filtered brewed coffee mixture in step 324. This step can be repeated as desired by the user. The user will then empty the contents of the inner vessel by passing the single filtered brewed coffee mixture through a secondary filter assembly disposed in the lid assembly to provide a double filtered brewed coffee mixture in step 326.

The heated water used in a brewing procedure with the coffee press apparatus 10 of the present concept is contemplated to be heated to a range of about 195 degrees to about 205 degrees F. Other ranges of heated water are also contemplated for use with the present concept. As noted above, the heated water is to be added to the inner vessel 140 at a ratio commensurate with the amount of coffee grounds previously added to the inner vessel 140. This ratio is contemplated to be determined by the user based on the user's preference with regards to the strength of a desired coffee beverage. In one method of using the coffee press apparatus 10, a user may guidelines of Table 1 below for preparing a coffee beverage. Table 1 provides suggested water-to-ground coffee ratios for use with the coffee press apparatus 10.

TABLE 1

| Cups | Water oz. (weight) | Water grams | Coffee grams | Approx. # of level scoops |
|---|---|---|---|---|
| 2 | 10 | 296 | 18 | 2 |
| 3 | 15 | 444 | 28 | 3 |
| 4 | 20 | 591 | 37 | 4 |
| 5 | 25 | 739 | 46 | 5 |

Again, Table 1 is exemplary of suggested water-to-coffee ratios for use with the coffee apparatus 10 of the present concept. Other ratios may be determined by the user, and with the integrated scale assembly of the present concept, the user can precisely determine the amount of heated water and coffee grounds needed to prepare a brewed beverage that is custom tailored to the users preferences and repeatable given the precision of the integrated scale assembly.

It will be understood by one having ordinary skill in the art that construction of the described concept and other components is not limited to any specific material. Other exemplary embodiments of the concept disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the concept as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present concept. The exemplary structures and processes disclosed herein are for illustrative purposes and are not to be construed as limiting.

It is also to be understood that variations and modifications can be made on the aforementioned structures and methods without departing from the concepts of the present concept, and further it is to be understood that such concepts are intended to be covered by the following claims unless these claims by their language expressly state otherwise.

What is claimed is:

1. A coffee press apparatus, comprising:
an outer container having a cavity with upper and lower portions;
a handle assembly extending outwardly from on the outer container and including a user interface;
an inner vessel disposed in the upper portion of the cavity of the outer container;
a spring plate having an outer rim coupled to a bottom wall of the inner vessel, wherein the spring plate includes a flexibly resilient spring finger extending from the outer rim and having a mounting portion vertically offset from the outer rim;
a scale assembly having a weighing sensor operably coupled to the mounting portion of the spring plate, wherein the scales assembly is disposed in the lower portion of the cavity of the outer container, and further wherein the scale assembly is electrically coupled to the user interface and measures a force imparted by the inner vessel when contents are added to the cavity of the inner vessel; and a plunger assembly removeably received in the inner vessel, the plunger assembly having a filter assembly.

2. The coffee press apparatus of claim 1, wherein the user interface includes a display screen for displaying weight measurements taken by the scale assembly.

3. The coffee press apparatus of claim 2, wherein the user interface includes a button for taring the scale assembly.

4. The coffee press apparatus of claim 3, wherein the user interface includes a button for initiating a timing sequence.

5. The coffee press apparatus of claim 2, wherein the user interface includes settings to display the weight measurements in multiple units.

6. The coffee press apparatus of claim 1, wherein the filter assembly of the plunger assembly comprises a wire mesh filter.

7. The coffee press apparatus of claim 1, including:
a battery source disposed in the lower portion of the cavity for powering the user interface and the scale assembly.

8. The coffee press apparatus of claim 1, wherein the inner vessel is spaced-apart from the outer container to define an air gap therebetween.

9. The coffee press apparatus of claim 1, including:
a lid assembly removeably received on an upper rim of the outer container, the lid assembly having a filter assembly disposed adjacent a spout configured on the upper rim of the outer container.

10. A coffee press apparatus, comprising:
an outer container having a cavity;
an inner vessel disposed in the cavity of the outer container;
a scale assembly operably coupled to a bottom wall of the inner vessel by a spring plate, wherein the spring plate includes a flexibly resilient spring finger having a mounting portion operably coupled to a weighing sensor of the scale assembly, and further wherein the scale assembly is enclosed within the cavity of the outer container;
a user interface electrically coupled to the scale assembly and configured to display a weight of the contents of the inner vessel; and
a plunger assembly slideably received through a lid assembly, wherein the plunger assembly includes a primary filter assembly, and further wherein the lid assembly includes a secondary filter assembly.

11. The coffee press apparatus of claim 10, including:
a handle assembly having upper and lower portions, wherein the user interface is disposed on the upper portion of the handle assembly.

12. The coffee press apparatus of claim 11, wherein the handle assembly includes an internal raceway connecting the cavity of the outer container with the upper portion of the handle assembly.

13. The coffee press apparatus of claim 12, including:
one or more leads electronically coupling the scale assembly to the user interface through the internal raceway of the handle assembly.

14. The coffee press apparatus of claim 13, including:
a battery source disposed in the cavity of the outer container for powering the user interface and scale assembly through the one or more leads.

15. The coffee press apparatus of claim 14, wherein the user interface further includes a display screen, a first button for initiating a timing sequence, and a second button for taring the scale assembly.

* * * * *